(12) United States Patent
Sinha et al.

(10) Patent No.: US 7,970,013 B2
(45) Date of Patent: Jun. 28, 2011

(54) SYSTEMS AND METHODS FOR WIRELESS NETWORK CONTENT FILTERING

(75) Inventors: Amit Sinha, Marlborough, MA (US); Nicholas John Darrow, Alpharetta, GA (US)

(73) Assignee: AirDefense, Inc., Alpharetta, GA (US)

( * ) Notice: Subject to any disclaimer, the term of this patent is extended or adjusted under 35 U.S.C. 154(b) by 1381 days.

(21) Appl. No.: 11/424,628

(22) Filed: Jun. 16, 2006

(65) Prior Publication Data

US 2008/0057913 A1 Mar. 6, 2008

(51) Int. Cl.
H04J 3/16 (2006.01)
H04J 3/22 (2006.01)
H04M 3/42 (2006.01)
H04W 4/00 (2009.01)
H04L 9/00 (2006.01)

(52) U.S. Cl. ........ 370/470; 370/332; 370/338; 370/471; 380/261; 379/201.12; 455/414.1

(58) Field of Classification Search ............. 379/201.12; 714/39; 709/224; 380/258, 261; 370/338, 370/466, 470, 471; 713/155; 455/414.1
See application file for complete search history.

(56) References Cited

U.S. PATENT DOCUMENTS

| | | | |
|---|---|---|---|
| 5,077,753 A | 12/1991 | Grau, Jr. et al. | |
| 5,231,634 A | 7/1993 | Giles et al. | |
| 5,237,614 A | 8/1993 | Weiss | |
| 5,339,316 A | 8/1994 | Diepstraten | |
| 5,393,965 A | 2/1995 | Bravman et al. | |
| 5,487,069 A | 1/1996 | O'Sullivan et al. | |
| 5,577,209 A | 11/1996 | Boyle et al. | |
| 5,646,389 A | 7/1997 | Bravman et al. | |
| 5,666,662 A | 9/1997 | Shibuya | |
| 5,737,328 A | 4/1998 | Norman et al. | |
| 5,745,479 A | 4/1998 | Burns et al. | |
| 5,745,483 A | 4/1998 | Nakagawa et al. | |
| 5,768,312 A | 6/1998 | Imamura | |
| 5,781,857 A | 7/1998 | Hwang et al. | |
| 5,787,077 A | 7/1998 | Kuehnel et al. | |
| 5,796,942 A | 8/1998 | Esbensen | |
| 5,809,060 A | 9/1998 | Cafarella et al. | |
| 5,825,817 A | 10/1998 | Tamaka et al. | |
| 5,844,900 A | 12/1998 | Hong et al. | |
| 5,866,888 A | 2/1999 | Bravman et al. | |
| 5,870,666 A | 2/1999 | Tanaka et al. | |
| 5,875,179 A | 2/1999 | Tikalsky | |
| 5,896,499 A | 4/1999 | McKelvey | |

(Continued)

FOREIGN PATENT DOCUMENTS

WO WO 98/59428 12/1998

(Continued)

OTHER PUBLICATIONS

*IBM unlocks wireless security services*, IT WORLD.COM (Date Alleged: Oct. 9, 2001) http://www.itworld.com/Net/2629/IDGO11009IBMsecurity (Accessed from Google's cache: Apr. 10, 2003.

(Continued)

*Primary Examiner* — Thjuan K Addy
(74) *Attorney, Agent, or Firm* — Clements Bernard PLLC; Lawrence A. Baratta, Jr.; Christopher L. Bernard

(57) ABSTRACT

Systems and methods of determining the content of frames transmitted on a wireless network through comparison of captured frames to predetermined statistical patterns.

27 Claims, 20 Drawing Sheets

U.S. PATENT DOCUMENTS

| | | | |
|---|---|---|---|
| 5,903,848 A | 5/1999 | Takahashi | |
| 5,913,174 A | 6/1999 | Casarez et al. | |
| 5,919,258 A | 7/1999 | Kayashima et al. | |
| 5,940,591 A | 8/1999 | Boyle et al. | |
| 5,953,652 A | 9/1999 | Amin et al. | |
| 5,987,609 A | 11/1999 | Hasebe | |
| 6,006,090 A | 12/1999 | Coleman et al. | |
| 6,058,482 A | 5/2000 | Liu | |
| 6,067,297 A | 5/2000 | Beach | |
| 6,070,244 A | 5/2000 | Orchier et al. | |
| 6,104,712 A | 8/2000 | Robert et al. | |
| 6,119,230 A | 9/2000 | Carter | |
| 6,122,757 A * | 9/2000 | Kelley | 714/39 |
| 6,141,778 A | 10/2000 | Kane et al. | |
| 6,145,083 A | 11/2000 | Shaffer et al. | |
| 6,151,357 A | 11/2000 | Jawahar et al. | |
| 6,158,010 A | 12/2000 | Moriconi et al. | |
| 6,178,512 B1 | 1/2001 | Fifield | |
| 6,185,689 B1 | 2/2001 | Todd, Sr. et al. | |
| 6,188,681 B1 | 2/2001 | Vesuna | |
| 6,202,157 B1 | 3/2001 | Brownlie et al. | |
| 6,272,129 B1 | 8/2001 | Dynarski et al. | |
| 6,272,172 B1 | 8/2001 | Deshpande et al. | |
| 6,282,546 B1 | 8/2001 | Gleichauf et al. | |
| 6,289,214 B1 | 9/2001 | Backstrom | |
| 6,292,508 B1 | 9/2001 | Hong et al. | |
| 6,301,668 B1 | 10/2001 | Gleichauf et al. | |
| 6,301,699 B1 | 10/2001 | Hollander et al. | |
| 6,304,973 B1 | 10/2001 | Williams | |
| 6,317,829 B1 | 11/2001 | Van Oorschot | |
| 6,320,948 B1 | 11/2001 | Heilmann et al. | |
| 6,324,647 B1 | 11/2001 | Bowman-Amuah | |
| 6,324,656 B1 | 11/2001 | Gleichauf et al. | |
| 6,330,244 B1 | 12/2001 | Swartz et al. | |
| 6,363,477 B1 | 3/2002 | Fletcher et al. | |
| 6,400,752 B1 | 6/2002 | Suzuki et al. | |
| 6,404,772 B1 | 6/2002 | Beach et al. | |
| 6,411,608 B2 | 6/2002 | Sharony | |
| 6,453,159 B1 | 9/2002 | Lewis | |
| 6,453,345 B2 | 9/2002 | Trcka et al. | |
| 6,466,608 B1 | 10/2002 | Hong et al. | |
| 6,470,384 B1 | 10/2002 | O'Brien et al. | |
| 6,473,449 B1 | 10/2002 | Cafarella et al. | |
| 6,477,198 B1 | 11/2002 | Gumm | |
| 6,484,029 B2 | 11/2002 | Hughes et al. | |
| 6,487,666 B1 | 11/2002 | Shanklin et al. | |
| 6,499,107 B1 | 12/2002 | Gleichauf et al. | |
| 6,501,951 B2 | 12/2002 | Moore | |
| 6,507,864 B1 | 1/2003 | Klein et al. | |
| 6,522,689 B1 | 2/2003 | Heinrich | |
| 6,539,207 B1 | 3/2003 | del Castillo et al. | |
| 6,539,428 B2 | 3/2003 | Davies | |
| 6,674,403 B2 | 1/2004 | Gray et al. | |
| 6,697,337 B1 | 2/2004 | Cafarelli et al. | |
| 6,799,047 B1 | 9/2004 | Bahl et al. | |
| 6,874,089 B2 | 3/2005 | Dick et al. | |
| 6,910,135 B1 | 6/2005 | Grainger | |
| 6,934,298 B2 | 8/2005 | Bentley | |
| 6,978,023 B2 * | 12/2005 | Dacosta | 380/258 |
| 7,218,643 B1 * | 5/2007 | Saito et al. | 370/466 |
| 7,613,920 B2 * | 11/2009 | Gustave et al. | 713/155 |
| 2001/0027107 A1 | 10/2001 | Shinozaki et al. | |
| 2001/0030956 A1 | 10/2001 | Chillariga et al. | |
| 2001/0038626 A1 | 11/2001 | Dynarski et al. | |
| 2001/0039579 A1 | 11/2001 | Trcka et al. | |
| 2002/0021745 A1 | 2/2002 | Negus | |
| 2002/0029288 A1 | 3/2002 | Dobbins et al. | |
| 2002/0032871 A1 | 3/2002 | Malan et al. | |
| 2002/0035699 A1 | 3/2002 | Crosbie | |
| 2002/0044533 A1 | 4/2002 | Bahl et al. | |
| 2002/0059434 A1 | 5/2002 | Karaoguz et al. | |
| 2002/0060994 A1 | 5/2002 | Kovacs et al. | |
| 2002/0060995 A1 | 5/2002 | Cervello et al. | |
| 2002/0061031 A1 | 5/2002 | Sugar et al. | |
| 2002/0066034 A1 | 5/2002 | Schlossberg et al. | |
| 2002/0072329 A1 | 6/2002 | Bandeira et al. | |
| 2002/0083343 A1 | 6/2002 | Crosbie et al. | |
| 2002/0087882 A1 | 7/2002 | Schneier et al. | |
| 2002/0090089 A1 | 7/2002 | Branigan et al. | |
| 2002/0090952 A1 | 7/2002 | Cantwell | |
| 2002/0094777 A1 | 7/2002 | Cannon et al. | |
| 2002/0101837 A1 | 8/2002 | Bender et al. | |
| 2002/0112047 A1 | 8/2002 | Kushwaha et al. | |
| 2002/0112185 A1 | 8/2002 | Hodges | |
| 2002/0129138 A1 | 9/2002 | Carter | |
| 2002/0138755 A1 | 9/2002 | Ko | |
| 2002/0147920 A1 | 10/2002 | Mauro | |
| 2002/0160769 A1 | 10/2002 | Gray | |
| 2002/0161755 A1 | 10/2002 | Moriarty | |
| 2002/0174364 A1 | 11/2002 | Nordman et al. | |
| 2002/0176437 A1 | 11/2002 | Busch et al. | |
| 2002/0178383 A1 | 11/2002 | Hrabik et al. | |
| 2002/0181417 A1 | 12/2002 | Malhotra et al. | |
| 2003/0009696 A1 | 1/2003 | Bunker V. et al. | |
| 2003/0021254 A1 | 1/2003 | Fukuda | |
| 2003/0026198 A1 | 2/2003 | Diepstraten et al. | |
| 2003/0027550 A1 | 2/2003 | Rockwell | |
| 2003/0036404 A1 | 2/2003 | Adachi et al. | |
| 2003/0048770 A1 | 3/2003 | Proctor, Jr. | |
| 2003/0060207 A1 | 3/2003 | Sugaya et al. | |
| 2003/0061344 A1 | 3/2003 | Monroe | |
| 2003/0061506 A1 | 3/2003 | Cooper et al. | |
| 2003/0063592 A1 | 4/2003 | Seki et al. | |
| 2003/0064720 A1 | 4/2003 | Valins et al. | |
| 2003/0065934 A1 | 4/2003 | Angelo et al. | |
| 2003/0070084 A1 | 4/2003 | Satomaa et al. | |
| 2003/0084323 A1 | 5/2003 | Gales | |
| 2003/0088789 A1 | 5/2003 | Fenton et al. | |
| 2003/0095520 A1 | 5/2003 | Aalbers et al. | |
| 2003/0096577 A1 | 5/2003 | Heinonen et al. | |
| 2003/0096607 A1 | 5/2003 | Taylor | |
| 2003/0100308 A1 | 5/2003 | Rusch | |
| 2003/0105976 A1 | 6/2003 | Copeland, III | |
| 2003/0108016 A1 | 6/2003 | Bonta | |
| 2003/0110398 A1 | 6/2003 | Dacier et al. | |
| 2003/0117966 A1 | 6/2003 | Chen | |
| 2003/0117985 A1 | 6/2003 | Fujii et al. | |
| 2003/0117986 A1 | 6/2003 | Thermond et al. | |
| 2003/0119526 A1 | 6/2003 | Edge | |
| 2003/0120821 A1 | 6/2003 | Thermond et al. | |
| 2003/0123420 A1 | 7/2003 | Sherlock | |
| 2003/0125035 A1 | 7/2003 | Khafizov et al. | |
| 2003/0126258 A1 | 7/2003 | Conkright et al. | |
| 2003/0135762 A1 | 7/2003 | Macaulay | |
| 2003/0140246 A1 | 7/2003 | Kammer et al. | |
| 2003/0149888 A1 | 8/2003 | Yadav | |
| 2003/0161341 A1 | 8/2003 | Wu et al. | |
| 2003/0174680 A1 | 9/2003 | Kuan et al. | |
| 2003/0185244 A1 | 10/2003 | Wu et al. | |
| 2003/0189908 A1 | 10/2003 | Kuan et al. | |
| 2003/0192055 A1 | 10/2003 | Aoki et al. | |
| 2003/0196115 A1 | 10/2003 | Karp | |
| 2003/0200455 A1 | 10/2003 | Wu | |
| 2003/0217289 A1 | 11/2003 | Ammon et al. | |
| 2003/0221006 A1 | 11/2003 | Kuan et al. | |
| 2003/0224797 A1 | 12/2003 | Kuan et al. | |
| 2004/0003285 A1 | 1/2004 | Whelan et al. | |
| 2004/0054774 A1 * | 3/2004 | Barber et al. | 709/224 |
| 2004/0068668 A1 | 4/2004 | Lor et al. | |
| 2004/0078598 A1 | 4/2004 | Barber et al. | |
| 2004/0102192 A1 | 5/2004 | Serceki | |
| 2004/0103307 A1 | 5/2004 | Raphaeli et al. | |
| 2004/0107219 A1 | 6/2004 | Rosenberger | |
| 2004/0136318 A1 | 7/2004 | Bentley | |
| 2004/0162995 A1 | 8/2004 | Muaddi et al. | |
| 2006/0153156 A1 * | 7/2006 | Wentink et al. | 370/338 |

FOREIGN PATENT DOCUMENTS

| | | |
|---|---|---|
| WO | WO 01/43467 A1 | 6/2001 |
| WO | WO 02/058346 A2 | 7/2002 |
| WO | WO 02/058346 A3 | 7/2002 |
| WO | WO 02/097560 A2 | 12/2002 |
| WO | WO 03/021851 | 3/2003 |
| WO | WO 03/079708 A1 | 9/2003 |
| WO | WO 03/084255 A1 | 10/2003 |

| | | |
|---|---|---|
| WO | WO 03/085544 A1 | 10/2003 |
| WO | WO 03/088547 A2 | 10/2003 |
| WO | WO 03/088687 | 10/2003 |

OTHER PUBLICATIONS

*IBM Research's Wireless Security Auditor One-Step Ahead of Hackers*, MOBILEINFO.COM, Issue 2001-30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).

*IBM Debuts First Self-Diagnostic Wireless Security Tool on Linux*, LWN.NET, (Date Alleged: Jun. 17, 2002) http://www.lwn.net/Articles/2661 (Accessed: Apr. 10, 2003).

Losi, Stephanie, *IBM Steps Up Wireless Security*, Newsfactor Network (Date Alleged: Oct. 8, 2001) http://www.newsfactor.com/perl/story/14012.html (Accessed: Apr. 10, 2003).

*IBM extends its Wireless Security Auditor with more autonomic features*, Serverworld: Online News (Date Alleged: Jun. 2002) http://www.serverworldmagazine.com/newsflash2/2002/06/19_ibmdwsa.shtml (Accessed: Apr. 10, 2003).

Schwartz, Ephraim, *IBM Offers a Peek at Self-Healing PCS: Autonomic computing initiative will lead to self-configuring desktops and notebooks and greater wireless security.* (Date Alleged: Nov. 19, 2002) http://www.pcworld.com/resource/printable/article/0,aid,107069.asp (Accessed from Google's cache: Apr. 10, 2003).

*IBM initiative addressed wireless security*, M2 Preswire (Date alleged: Oct. 9, 2001) http://www.lexis.com/research (Accessed: Apr. 10, 2003).

Manecksha, Ferina, *IBM to focus on "Think" strategy*, News Straits Times—Management Times (Date Alleged: Jan. 30, 2003) http://www.lexis.com/research (Accessed: Apr. 10, 2003).

Schwartz, Ephraim, *IBM unveils autonomic computing on notebooks, desktops*, Inforworld Daily News (Dated Alleged: Nov. 19, 2002) http://www.lexis.com/research (Accessed: Apr. 10, 2003).

Toomgum, Sirvish, *"Think" Big Blue, NATION*, Worldsources, Inc. (Date Alleged: Nov. 19, 2002) http://www.lexis.com/research (Accessed: Apr. 10, 2003).

Morochove, Richard, *Why Dell lets competitors do the heavy lifting*, Toronto Star (Date Alleged: Nov. 11, 2002) http://www.lexis.com/research (Accessed: Apr. 10, 2003).

*Wireless Security Auditor (WSA)*, IBM Security Research http://www.research.ibm.com/gsal/wsa/ (Accessed: Apr. 10, 2003).

*Distributed Wireless Security Auditor*, IBM Research http://www.researchibm.com/gsal/dwsa/ (Accessed: Apr. 10, 2003).

*WhereLAN Location Sensor Locating Access Point*, WhereNet U.S.A. (2002).

Article entitled "A Short Tutorial on Wireless LANs and IEEE 802.11" by Lough et al., printed on May 27, 2002 in *The IEEE Computer Society's Student Newsletter*, Summer 1997, vol. 5, No. 2.

* cited by examiner

| Codec | GSM 6.10 | G.711 | G.723.1 | G.729 |
|---|---|---|---|---|
| Bit Rate (kbps) | 13.2 | 64 | 5.3/6.3 | 8 |
| Payload (bytes) | 33 | 160 | 20/24 | 10 |
| Packets/sec | 50 | 50 | 33 | 50 |
| Mean Opinion Score | 3.7 | 4.1 | 3.65/3.9 | 3.27 |
| Algorithmic Delay (ms) | 20 | 0.75 | 30/30 | 15 |

Popular Voice Codecs 250

FIG. 7

Statistical Pattern 700
- Frame 1 701: Frame length 710 | Size Drift 720 | Direction 730
- Frame 2 702: Frame length 710 | Size Drift 720 | Direction 730
- ...
- Frame N 703: Frame length 710 | Size Drift 720 | Direction 730
- Frame Count Scope (FCS) 740

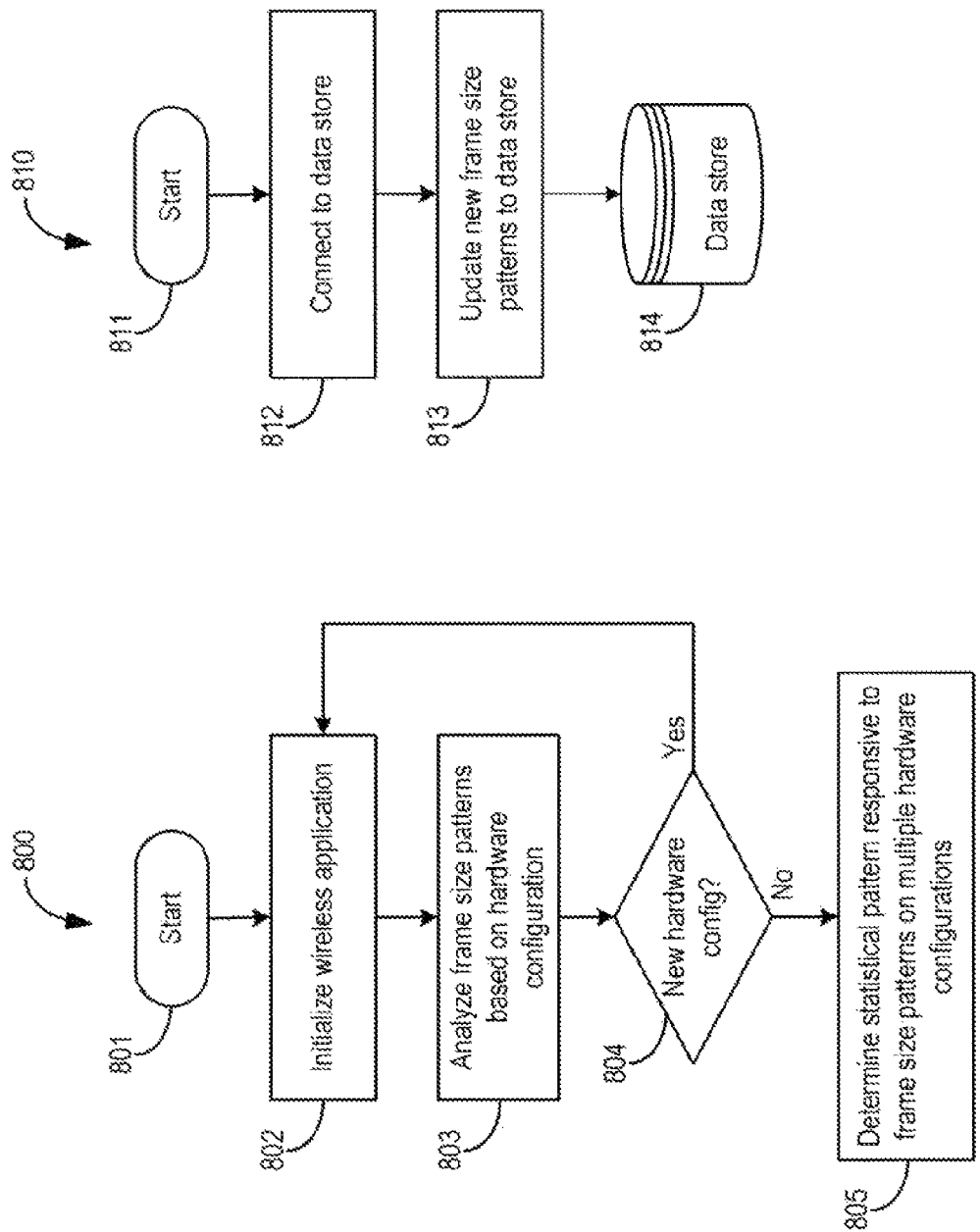

| Application | Source | Destination | Group A Size | Group B Size | Difference | Error % | # Packets |
|---|---|---|---|---|---|---|---|
| Antivirus Update AVG version 7.0 free edition | C | GW | 394 | 394 | 0 | | |
| | GW | C | 90 | 84 | -6 | | |
| | GW | C | 228 | 228 | 0 | | |
| | GW | C | 90 | 84 | -6 | | |
| | C | GW | 84 | 84 | 0 | | |
| | | | 886 | 874 | | 1.37% | 20 |

FIG. 13A

| Application | Source | Destination | Group A Size | Group B Size | Difference | Error % | # Packets |
|---|---|---|---|---|---|---|---|
| Google Earth | C | GW | 499 | 499 | 0 | | |
| | GW | C | 539 | 539 | 0 | | |
| | C | GW | 519 | 519 | 0 | | |
| | GW | C | 1444 | 1444 | 0 | | |
| | | | 3001 | 3001 | | 0.00% | 15 |

FIG. 13B

| Application | Source | Destination | Group A Size | Group B Size | Difference | Error % | # Packets |
|---|---|---|---|---|---|---|---|
| Winamp Shoutcast | C | GW | 1364 | 1364 | 0 | | |
| | GW | C | 84 | 84 | 0 | | |
| | | | 4449 | 4449 | | 0.00% | 5 |

FIG. 13C

| Application | Source | Destination | Group A Size | Group B Size | Difference | Error % | # Packets |
|---|---|---|---|---|---|---|---|
| OpenVPN SSL | C | GW | 92 | 92 | 0 | | |
| | GW | C | 92 | 92 | 0 | | |
| | C | GW | 84 | 84 | 0 | | |
| | GW | C | 128 | 128 | 0 | | |
| | C | GW | 128 | 128 | 0 | | |
| | GW | C | 90 | 84 | -6 | | |
| | C | GW | 140 | 140 | 0 | | |
| | GW | C | 140 | 140 | 0 | | |
| | | | 626 | 620 | | 0.97% | 50 |

FIG. 13D

| Application | Source | Destination | Group A Size | Group B Size | Difference | Error % | # Packets |
|---|---|---|---|---|---|---|---|
| Trillian AIM | C | GW | 92 | 92 | 0 | | |
| | GW | C | 80 | 88 | -2 | | |
| | C | GW | 84 | 84 | 0 | | |
| | GW | C | 94 | 94 | 0 | | |
| | C | GW | 94 | 94 | 0 | | |
| | GW | C | 90 | 84 | -6 | | |
| | C | GW | 122 | 122 | 0 | | |
| | | | 484 | 478 | | 1.26% | 15 |

FIG. 13E

| Application | Source | Destination | Group A Size |
|---|---|---|---|
| SMB Local Master | C | Bcast | 299 |
| ARP Req | GW | C | 90 |
| DNS Query | C | GW | 109 |
| | GW | C | 162 |

FIG. 13F

| Application | Source | Destination | Size Drift % | Base | Upper | Lower |
|---|---|---|---|---|---|---|
| Antivirus Update | C | GW | 0 | 394 | 394 | 394 |
| AVG version 7.0 free edition | GW | C | 11 | 84 | 93 | 75 |
| | GW | C | 0 | 228 | 228 | 228 |
| | GW | C | 11 | 84 | 93 | 75 |
| | C | GW | 11 | 84 | 93 | 75 |

FIG. 14

SYSTEMS AND METHODS FOR WIRELESS NETWORK CONTENT FILTERING

CROSS-REFERENCE TO RELATED APPLICATIONS

This application further incorporates by this reference in their entirety for all purposes commonly assigned U.S. patent applications filed Jun. 3, 2002:

| Application No. | Title |
| --- | --- |
| 10/161,142 | "SYSTEMS AND METHODS FOR NETWORK SECURITY" |
| 10/161,440 | "SYSTEM AND METHOD FOR WIRELESS LAN DYNAMIC CHANNEL CHANGE WITH HONEYPOT TRAP" |
| 10/161,443 | "METHOD AND SYSTEM FOR ACTIVELY DEFENDING A WIRELESS LAN AGAINST ATTACKS" |
| 10/160,904 | "METHODS AND SYSTEMS FOR IDENTIFYING NODES AND MAPPING THEIR LOCATIONS" |
| 10/161,137 | "METHOD AND SYSTEM FOR ENCRYPTED NETWORK MANAGEMENT AND INTRUSION DETECTION" |

Furthermore, this application incorporates by reference for all purposes, commonly assigned U.S. patent applications filed Nov. 4, 2003:

| Application No. | Title |
| --- | --- |
| 10/700,842 | "SYSTEMS AND METHODS FOR AUTOMATED NETWORK POLICY EXCEPTION DETECTION AND CORRECTION" |
| 10/700,914 | "SYSTEMS AND METHOD FOR DETERMINING WIRELESS NETWORK TOPOLOGY" |
| 10/700,844 | "SYSTEMS AND METHODS FOR ADAPTIVELY SCANNING FOR WIRELESS COMMUNICATIONS" |

Furthermore, this application incorporates by reference for all purposes, commonly assigned U.S. patent applications filed Feb. 6, 2004:

| Application No. | Title |
| --- | --- |
| 10/774,034 | "SYSTEMS AND METHODS FOR ADAPTIVE LOCATION TRACKING" |
| 10/774,111 | "WIRELESS NETWORK SURVEY SYSTEMS AND METHODS" |
| 10/774,896 | "SYSTEMS AND METHODS FOR ADAPTIVE MONITORING WITH BANDWIDTH CONSTRAINTS" |
| 10/774,915 | "DYNAMIC SENSOR DISCOVERY AND SELECTION SYSTEMS AND METHODS" |

Furthermore, this application incorporates by reference for all purposes, commonly assigned U.S. patent applications filed Oct. 19, 2005:

| Application No. | Title |
| --- | --- |
| 11/253,316 | "PERSONAL WIRELESS MONITORING AGENT" |

Furthermore, this application incorporates by reference for all purposes, commonly assigned U.S. patent applications filed Jan. 13, 2006:

| Application No. | Title |
| --- | --- |
| 11/332,065 | "SYSTEMS AND METHODS FOR WIRELESS INTRUSION DETECTION USING SPECTRAL ANALYSIS" |

Furthermore, this application incorporates by reference for all purposes, commonly assigned U.S. patent applications filed Mar. 17, 2006:

| Application No. | Title |
| --- | --- |
| 11/276,925 | "SYSTEMS AND METHODS FOR WIRELESS SECURITY USING DISTRIBUTED COLLABORATION OF WIRELESS CLIENTS" |
| 11/276,930 | "SYSTEMS AND METHODS FOR WIRELESS NETWORK FORENSICS" |

This application also incorporates by reference for all purposes, commonly assigned U.S. patent application filed May 10, 2006:

| Application No. | Title |
| --- | --- |
| 11/382,590 | "RFID INTRUSION PROTECTION SYSTEM AND METHODS" |

BACKGROUND AND SUMMARY

This disclosure relates to wireless network content filtering systems and methods, and more particularly to systems and methods for analyzing frames transmitted over a wireless network to determine the content based on statistical pattern analysis.

Wireless networks, also known as Wireless Local Area Networks (WLANs), offer a quick and effective extension of a wired network or a standard local area network (LAN). Wireless networks have been able to achieve transmission rates close to traditional wired networks such as 11 Mb/s and 54 Mb/s. As such, users can execute the same applications using wireless networks as can be executed using wired networks.

Wireless networks can include nodes such as wireless access points (APs) and wireless client devices. A wireless AP is a device that connects wireless communications devices together to form a wireless network. The AP can connect to a wired network, and can relay data between wireless devices and wired devices. Wireless client devices can include laptop and desktop computers, and other devices capable of networked communication that are equipped with wireless capability. Nodes can communicate to another node or broadcast on the wireless network.

Wireless networks operated based on standards such as the Institute of Electrical and Electronics Engineers (IEEE) 802.11 family of protocols. Such standards define wireless frames for transmission over the wireless link. Wireless frames are packets which have been encoded for transmission over the wireless network. Frames include delimiters to distinguish the start of a frame, address and control fields in overhead specific to the standard, the payload, and checksums to detect errors. Frames may vary in size depending on the type of payload and the overhead.

Wireless frames can include data frames used for data transmission, control frames used for access, and management frames transmitted similarly to data frames but not forwarded to upper levels. Each wireless frame can have a different length in terms of number of bits included in the frame. The lengths can vary as a function of the frame payload, the hardware configuration, or the network operating environment. For example, a control frame can be 112 bits and a data frame could be up to 18,768 bits.

Wireless frames typically include encryption to prevent monitoring or unauthorized viewing of the transmission. Examples of encryption used include, for example, among others: WEP, TKIP, AES, both static keys as well as rotating encryption techniques such as WPA-TKIP, WPA2-AES (e.g., WPA-Personal, WPA2-Personal, WPA-Enterprise, WPA2-Enterprise). Encryption methods and techniques are described in the IEEE 802.11i and amendments to 802.11i, all of which are hereby incorporated by reference. Encryption prevents a monitoring system from discovering the contents of the frame body.

Applications operating on a node in the wireless network can transmit and receive data in the form of wireless frames on a wireless network. Applications can include web traffic such as HTTP or HTTPS, steaming video or audio, updates of programs such as an antivirus program, file sharing such as peer-to-peer or SMB/NMB Windows file sharing, virtual private networks such as IPSEC or SSL, and UDP-based Internet application including networked games, video streaming tools and audio/video conferencing tools.

Systems and methods exist for monitoring the transmission of frames on wireless networks. For example, various "sniffer" programs exist allowing a user to monitor and capture frames transmitted on a wireless network. Sniffer programs can operate on a computer equipped with a wireless client device. In the case of encrypted frames, sniffer programs can capture the encrypted frame and view the frame size and direction (e.g., source and destination address), but cannot view the encrypted frame body. Additionally, monitoring programs can capture frame arrival statistics between nodes.

Further, monitoring systems have been developed to provide intrusion detection and prevention in wireless networks. A typical wireless intrusion prevention system (WIPS) includes multiple distributed monitoring devices, such as sensors, APs, or software agents, and one or more servers connected to the distributed monitoring devices. WIPS are configured to detect unauthorized devices and attacks on the network, to prevent attacks, and to terminate unauthorized devices.

WIPS distributed monitoring devices are configured to monitor the wireless network and to transmit data, events, and statistics to the servers. The WIPS can determine if a device is authorized or not based on the wireless network policy (e.g., authorized MAC addresses). However, a WIPS system cannot monitor the frame contents of encrypted frames. In the case of an unauthorized device operating on the wireless network with encryption, the WIPS cannot monitor the activity of that device.

Additionally, an authorized device can operate unauthorized applications over the wireless network. For example, an authorized MAC address could be running a peer-to-peer file sharing network, online game, or streaming video, against network policy. A WIPS or monitoring system would not be able to detect these applications if the transmission is encrypted. For unencrypted frames, a monitoring system could determine the frame contents. However, this would involve detailed inspection of the frame contents. These systems and methods use processing ability and would not typically be suited for large scale wireless deployments.

In various examples, this disclosure provides systems and methods for wireless content filtering to determine the content of frames transmitted between two nodes on a network using data link layer statistics such as, for example, frame length and frame direction. Specific applications can exhibit unique frame length and direction patterns during initial handshakes and during streaming of content. These unique patterns can be used to perform statistical pattern matching to monitored frames to determine the content. Wireless content filtering systems and methods can facilitate a content determination without detailed frame inspection and for encrypted frames. Such systems and methods can further be used in wireless security systems to terminate unauthorized applications and in general to determine quality-of-service statistics without detailed frame inspection.

Methods of determining the content of frames transmitted on a wireless network can include: monitoring a plurality of frames transmitted between two nodes on the wireless network; and matching the frame lengths and the direction between the two nodes of the plurality of frames to known statistical patterns.

Methods for characterizing patterns of frame lengths corresponding to an application can include: providing a first hardware configuration comprising two wireless devices; operating the application on one of the wireless devices; monitoring the lengths and directions of frames by the application between the two wireless devices; repeating the providing, operating, and monitoring steps for a second or more hardware configuration; and analyzing the lengths and directions of frames responsive to one or more hardware configurations to determined a statistical frame pattern.

Methods of determining the content of frames by matching to known statistical patterns can include: loading a content analysis engine and a plurality of known statistical patterns; starting a data source, the data source receives incoming frames transmitted between two nodes on a network; checking if a frame matches a first line in the plurality of known statistical patterns; and if a match is found in the checking step, loading a detection thread, the detection thread comprises the steps of receiving subsequent incoming frames transmitted between two nodes on the network and matching the subsequent incoming frames to subsequent lines in the plurality of known statistical patterns until a predetermined frame count is met.

Systems for determining the content of wireless frames transmitted between two nodes on a wireless network can include: a monitoring device operable to monitor and capture frame lengths and frame directions of a plurality of frames transmitted between nodes on the wireless network; a data store loaded with known statistical patterns corresponding to different applications; and a computer operable to receive the frame lengths and frame directions of the plurality of frames and operable to perform statistical matching of the frame lengths and frame directions to the known statistical patterns in the data store.

BRIEF DESCRIPTION OF THE DRAWINGS

The present disclosure is illustrated and described herein with reference to the various drawings, in which like reference numbers denote like system components and/or method steps, as appropriate, and in which:

FIG. 7 is a block diagram depicting an example statistical pattern.

FIGS. 8A-8B are flowcharts depicting operational scenarios for determining and updating known statistical patterns.

FIGS. 13A-13F are tables illustrating example applications and their associated patterns of frame lengths.

FIG. 14 is a table illustrating an example statistical frame pattern.

DETAILED DESCRIPTION

This disclosure relates to systems and methods for wireless content filtering to determine the content of frames transmitted between two nodes on a network using data link layer statistics such as frame length and frame direction. Specific applications exhibit unique frame length and direction patterns during initial handshakes and during streaming of content. These unique patterns can be used to perform statistical pattern matching to monitored frames to determine the content. Advantageously, wireless content filtering systems and methods allow for content determination without detailed frame inspection and for encrypted frames. Such systems and methods can further be used in wireless security systems to terminate unauthorized applications and in general to determine quality-of-service statistics without detailed frame inspection.

The data link layer is layer two of the Open Systems Interconnection (OSI) Reference Model. It responds to service requests from the network layer (layer three) and issues service requests to the physical layer (layer one). The data link layer is where data is transferred between nodes in a network. The data link layer in some networks, such as IEEE 802 networks, is subdivided into the media access control (MAC) and the logical link control (LLC) sub layer.

A frame can be a packet of data encoded for transmission over a physical link. The MAC sub layer can recognize where frames begin and end in the bit-stream received from the physical layer when receiving; delimiting the frames when sending, e.g. inserting information (e.g. some extra bits) into or among the frames being sent so that the receiver(s) are able to recognize the beginning and end of the frames; detection of transmission errors by means of inserting a checksum into every frame sent and recalculating and comparing them on the receiver side; inserting the source and destination MAC addresses into every frame transmitted; filtering out the frames intended for the station by verifying the destination address in the received frames; and the control of access to the physical transmission medium.

Networking protocols such as asynchronous transfer mode (ATM), ethernet, multi-protocol label switching (MPLS), token ring, and frame relay also utilize frames for transmission at the data link layer. This disclosure utilizes examples of 802.11 MAC frames on wireless networks, but the systems and methods disclosed can be utilized on any networking protocol in which frame sizes vary distinctly responsive to the frame content.

Figure 1A:
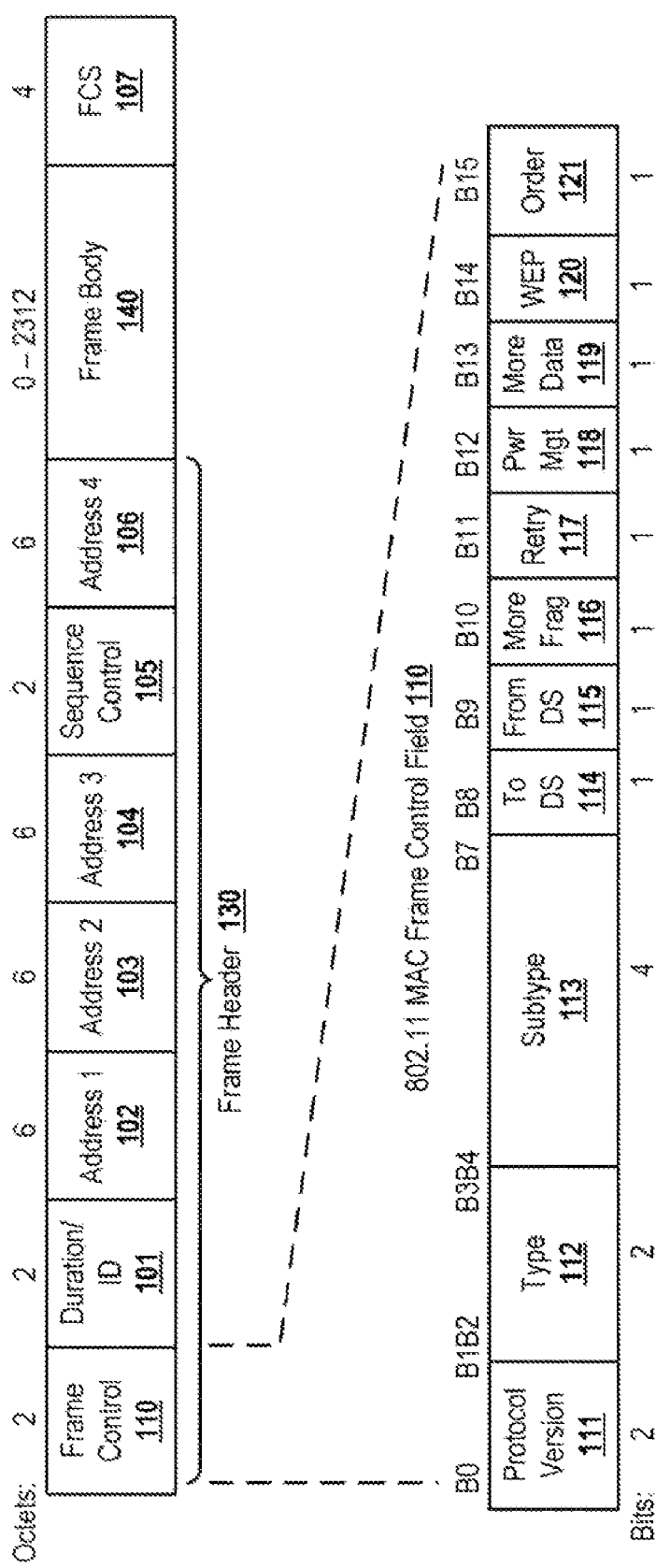
FIGS. 1A-1C are block diagrams of 802.11 media access control (MAC) frames.

FIG. 1A depicts a block diagram showing the fields of an 802.11 media access control (MAC) frame format 100. The 802.11 MAC frame format 100 is a used for transmitting frames on a wireless local area network (WLAN). The MAC frame 100 can include a frame header 130, a frame body 140, and a frame check sequence (FCS) 107.

The frame header 130 can include frame control 110; duration/ID 101; addresses 102, 103, 104, 106; and sequence control 105 information. The frame control 110 field includes the following subfields: protocol version 111, type 112, subtype 113, to DS 114, from DS 115, more fragments (frag) 116, retry 117, power management (pwr mgt) 118, more data 119, wired equivalent privacy (WEP) 120, and order 121.

Protocol version 111 is two bits in length. Type 112 is two bits in length and subtype 113 is four bits in length. The type 112 and subtype 113 together identify whether the frame type is control, data, or management, and further identify the subtype of the frame. The "to DS" field 114 and "from DS" field 115 are each one bit in length and set according to whether the frame is destined or exiting the distribution system (DS). The "more frag" field 116 is one bit in length and is set according to whether data or management frames have another fragment to follow.

The "retry" field 117 is one bit in length and is set according to whether a data or management frame is a retransmission of an earlier frame to allow a receiver to aid in eliminating duplicate frames. The "pwr mgt" field 118 is one bit in length and is used to indicate the power management mode of a station. The "more data" field 119 is one bit in length and used to indicate to a station in power-save mode that more data units are buffered for that station. The "WEP" field 120 is one bit in length and set according to whether the frame body 140 includes WEP information for encryption. The "order" field 121 is one bit in length and is set whether a frame is being transferred using the "StrictlyOrdered" service class.

The "duration/ID" field 101 is sixteen bits (two octets) in length and is used to update network allocation vector (NAV) and also used to identify the station that transmitted the frame in certain control frames. The MAC frame 100 includes four address fields 102, 103, 104, 106 which are used to identify the source address, destination address, transmitting station address and receiving station address. Each address field 102, 103, 104, 106 is forty-eight bits in length (six octets). The sequence control 105 field is sixteen bits in length (two octets) and includes subfields for the sequence number and the fragment number, and the sequence control 105 is used to order a frame when it is a fragment in a data unit.

The frame body 140 is variable length and includes information specific to individual frame types and sub types. The minimum length of the frame body 140 is zero bits. The maximum length of the frame body 140 is 2312 octets which is the maximum length of the MAC service data unit (MSDU) which is 2304 octets plus the WEP integrity check value (ICV) which is four octets and the WEP initialization vector (IV) which is four octets. The FCS 107 field includes an IEEE 32-bit cyclic redundancy code (CRC) and is sixteen bits (four octets) in length.

Figure 1B:
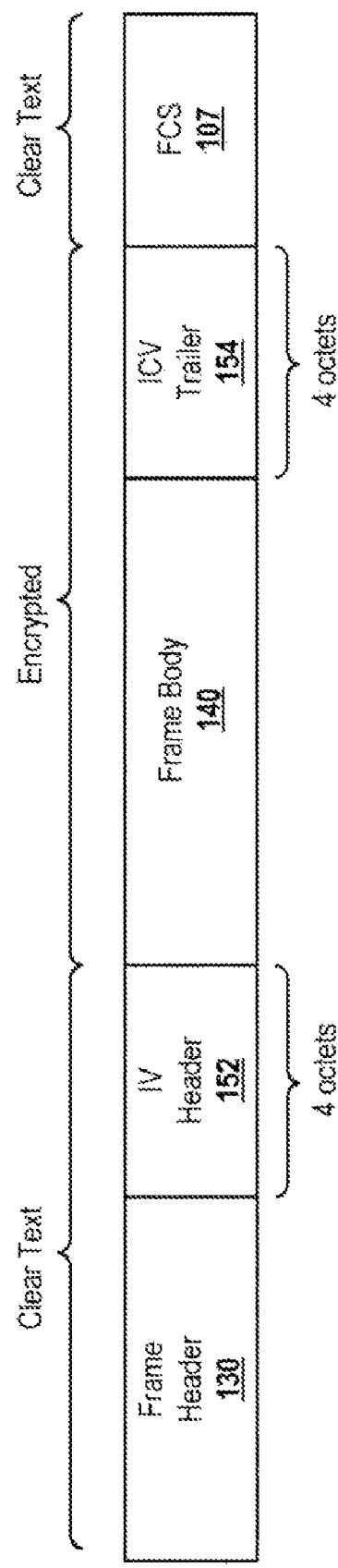

FIG. 1B depicts a block diagram of the fields of an 802.11 encrypted frame format 150. IEEE 802.11 specifies a wired local area network (LAN) equivalent data confidentiality algorithm. Wired equivalent privacy (WEP) protects authorized users of a wireless LAN from casual eavesdropping. This service can provide functionality for the wireless LAN equivalent to the functionality provided by the physical security attributes inherent to a wired medium. It is generally difficult to determine the content of a wireless frame which is encrypted without the detection key.

The 802.11 encrypted frame format 150 can include the frame header 130, an initialization vector (IV) header 152, the frame body 140, an integrity check value (ICV) trailer 154, and the FCS 107. An example frame header 130 is depicted in FIG. 1A and is transmitted as clear text (e.g., not encrypted). The IV header 152 and the ICV trailer 154 are each four octets in length. The IV header 152 is transmitted in clear text and the ICV trailer 154 is encrypted along with the frame body 140. The IV header 152 and the ICV trailer 154 work to form the WEP encryption.

Figure 1C:
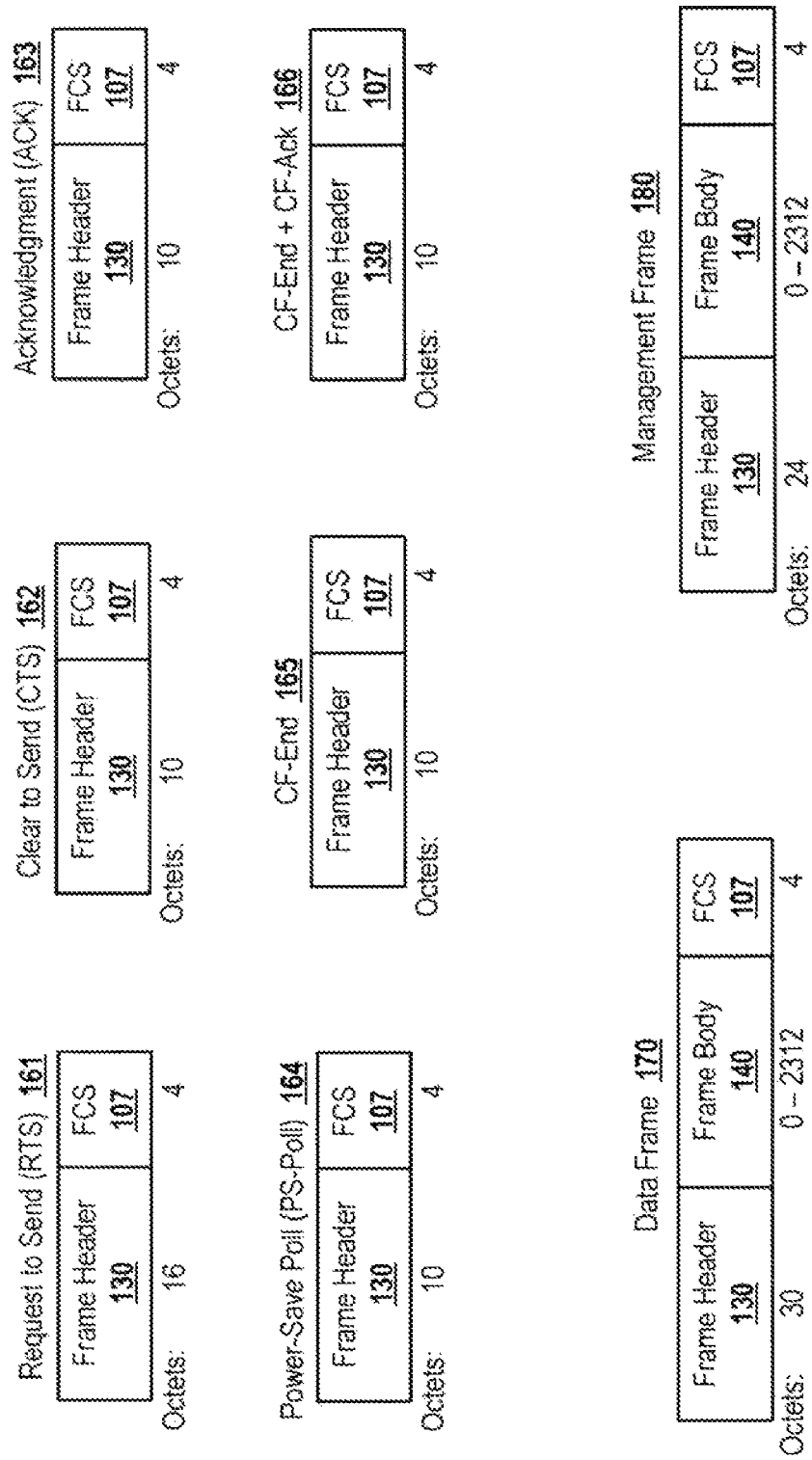

FIG. 1C illustrates the frame sizes of control frames (161, 162, 163, 164, 165, 166), data frames 170, and management frames 180. Control frames have lengths of 14 octets in the case of Clear-to-Send (CTS) frames 162, Acknowledgement (ACK) frames 163, Power-Save Poll frames 164, CF-End frames 165, and CF-End+CF-Ack frames 166. The Request-to-Send (RTS) control frame 161 has a length of 20 octets. Control frames (161, 162, 163, 164, 165, 166) include the frame header 130 and the FCS 107. Control frames (161, 162, 163, 164, 165, 166) do not include a frame body.

Data frames 170 can have a frame length from 34 to 2346 octets depending on the size of the frame body 140. The data frame 170 has a frame header with a length of 30 octets, an FCS 107 with a length of 4 octets, and a variable length frame body from 0 to 2312 octets depending on the frame content.

Management frames 180 can have a frame length from 28 to 2340 octets depending on the size of the frame body 140. The management frame 180 has a frame header with a length of 24 octets, an FCS 107 with a length of 4 octets, and a variable length frame body from 0 to 2312 octets depending on the frame content.

Figures 2A, 2B:
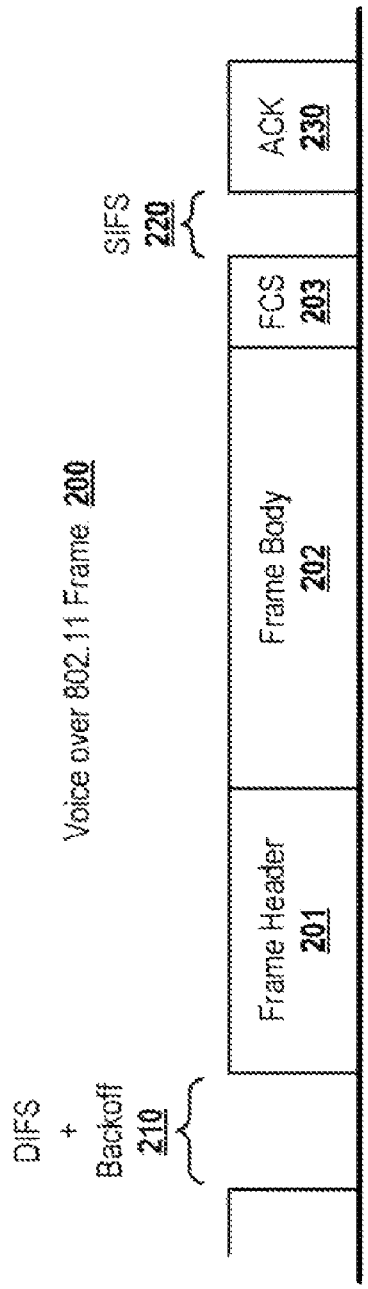
FIGS. 2A-2B are block diagrams of voice over 802.11 transmissions and statistics relating to various voice over 802.11 protocols.

FIG. 2A depicts a block diagram of a voice over 802.11 frame 200. Voice over 802.11 is one example of content capable of operating over a wireless network. The distributed coordination function (DCF) is a contention based access method. A station (e.g., client) that is ready to transmit a frame senses a wireless medium, if the medium is busy, the station will wait for an additional predetermined time period of DIFS (DCF Interframe Space) length. The voice over 802.11 frame 200 can include a frame header 201, a frame body 202, and a frame check sequence (FCS) 203. The frame 200 is transmitted on the wireless network after a DIFS+backoff 210 period where the wireless medium is not busy.

The frame header 201 can include the fields depicted in the frame header 130 (FIG. 1A). The frame body 202 can include data and is a variable length depending on the data being sent. Finally, the FCS 203 can include a CRC field. After the frame 200 is transmitted on the wireless medium, there is a short-inter frame space timeout (SIFS) 220. The SIFS is a short time period during which the client waits before sending an acknowledgment (ACK) frame 230. The DIFS+backoff and SIFS time periods 210, 220, respectively, can be monitored by a wireless monitoring system in addition to monitoring the individual frame lengths of the wireless frames.

FIG. 2B is a table illustrating example specifications of some popular voice codecs 250. Voice codecs 250 can include different standards such as GSM 6.10, G.711, G.723.1, and G.729. The frames sizes listed in the table of FIG. 2B are application layer sizes. For example, for GSM 6.10 the 802.11 MAC will receive a frame=40 bytes (IP/UDP/RTP headers)+33 bytes of voice payload. The table shows the voice payload size. The 802.11 MAC will add all its own headers, FCS, etc. as depicted in FIGS. 1A-1C.

Each uses a different bit rate and payload size for transmission and a different number of packets transmitted per second. The Mean Opinion Score (MOS) can provide a numerical indication of the perceived quality of received human speech over the connection. The MOS is expressed as a single number in the range 1 to 5, where 1 is lowest perceived quality, and 5 is the highest perceived quality.

A wireless system can be configured to monitor the frame lengths and the time periods between wireless frame transmissions. Such frame lengths can be used to perform statistical pattern matching to known frame length patterns to determine the content of the wireless frames (e.g., statistical pattern matching to determine a specific voice over 802.11 codec).

Figure 3:
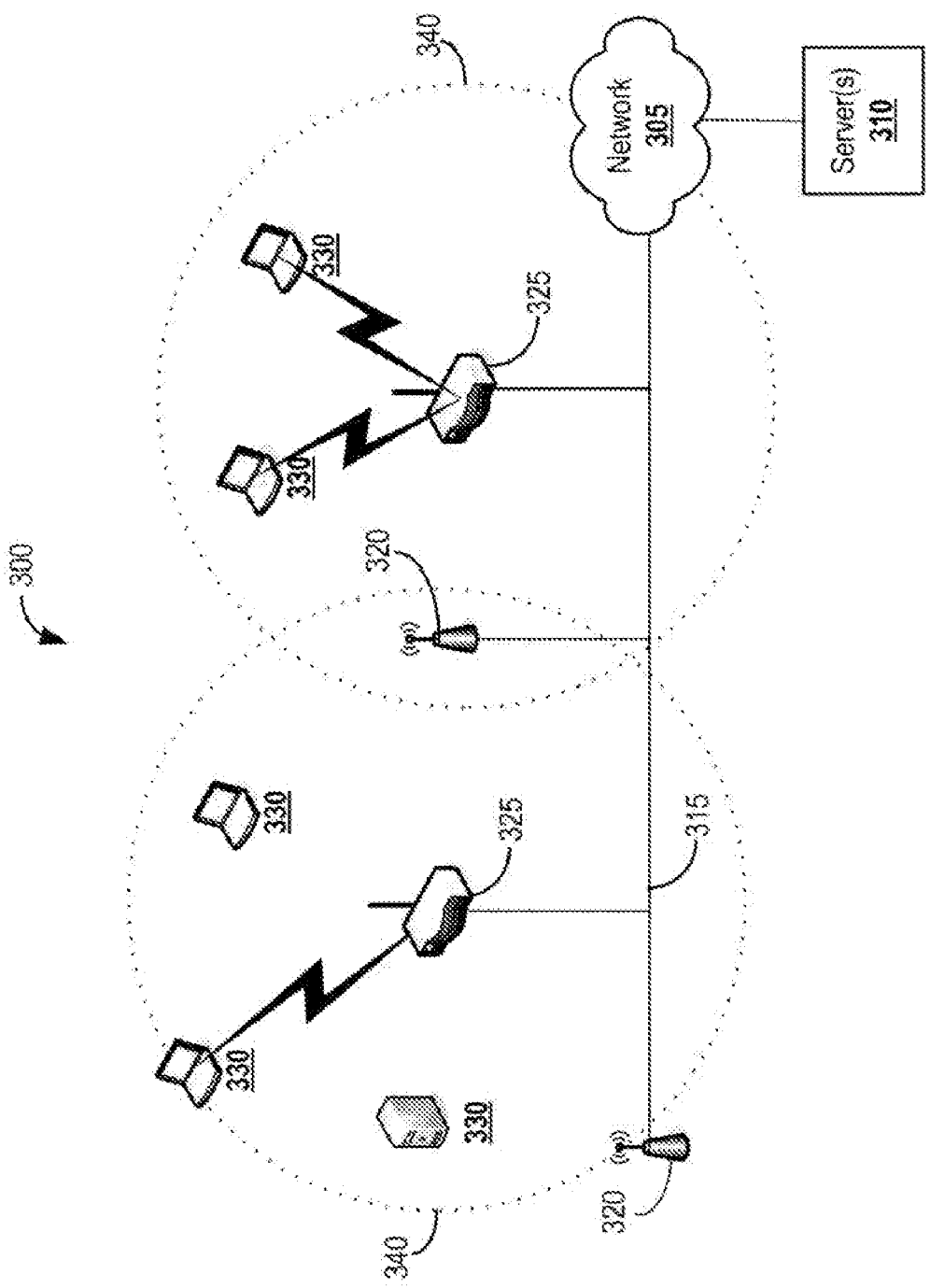
FIG. 3 is an illustrative example of a wireless network including a sensor and a server.

FIG. 3 is an illustrative example of a wireless network 300 including two sensors 320 and a server 310. The wireless network 300, in this example, includes two wireless access points (APs) 325 and multiple wireless clients 330. The APs 325 typically include a wireless radio configured to transmit and receive wireless data within a coverage area 340. In this example, the APs 325 connect to a local area network (LAN) 315, which can be an Internet protocol (IP) network. Additionally, the APs 325 can connect together through a wireless connection to other APs 325 (not shown). The LAN 315 is connected to a network 305 which can be, for example, an IP network such as the Internet, a wide-area network (WAN), or a virtual private network (VPN).

The wireless network 300 can include multiple clients 330 configured with a wireless device for communications to the APs 325. Example clients 330 can include desktop computers, notebook computers, storage devices, printers, or any other system that is equipped with a wireless device. The wireless device in the clients 330 can include wireless radios configured to communicate over the wireless network 300 along with hardware and firmware to interface locally to the client 330. FIG. 3 depicts several clients 330 actively communicating to the APs 325 over the wireless network 300.

The wireless network 300 includes the sensors 320 and server(s) 310 for monitoring data, events, and statistics on the wireless network 300. In this example, the sensors 320 are located at central locations to monitor traffic in the coverage areas 340 of the APs 325. The sensors 320 can include a wireless radio configured to transmit and receive wireless data, a processing engine to analyze received data, and a communications interface to communicate processed data to the server(s) 310. The communications interface of the sensors 320 can be connected to the LAN 315. Moreover, the sensors can communicate to the server(s) 310 through the network 305 or through some other communications interface such as a direct connection (e.g. universal serial bus) or a wireless connection.

The sensors 320 are configured to monitor data transmitted on the wireless network 300 and to provide relevant data, events, and statistics to the server(s) 310. The server(s) 310 is configured to receive and correlate data, events, and statistics from the sensors 320. Additionally in some examples, APs 325 and clients 330 can occasionally operate as sensors 320 and communicate data, events, and statistics to the server(s) 310. In other examples, clients 330 can be configured with software agents, allowing the clients 330 to periodically monitor the wireless network 300 and to communicate data, events, and statistics from monitoring the wireless network 300 to the server(s) 310.

The server(s) 310 is configured to detect attacks and events, network performance degradation, and network policy compliance on the wireless network 300. Further, the server(s) 310 may be configured to direct the sensors 320 to terminate a rogue wireless client (e.g. an unauthorized user). Also, the server(s) may include a data store to log history and trends relating to the wireless network 300. The combination of the server(s) 310 and sensors 320 can sometimes be called a Wireless Intrusion Prevention System (WIPS). An example of a WIPS system is the AirDefense Enterprise Release 7.0 (available from the assignee, AirDefense, Inc. of Alpharetta, Ga.).

The server(s) 310 and the sensors 320 can be configured to analyze the frame lengths of the wireless frames monitored by the sensors to compare current or logged frame length patterns between two devices with existing pre-determined statistical patterns. For example, the sensors 320 can be configured to analyze frame lengths while monitoring the wireless network and then the sensors 320 communication the analyzed information to the server. Additionally, the server(s) 310 and sensors 320 can collaborate to share the analysis of frames. The analysis can be used to determine based on statistical pattern matching the content of the wireless frames without detailed packet inspection of the frames or with encrypted frames.

Figure 4:
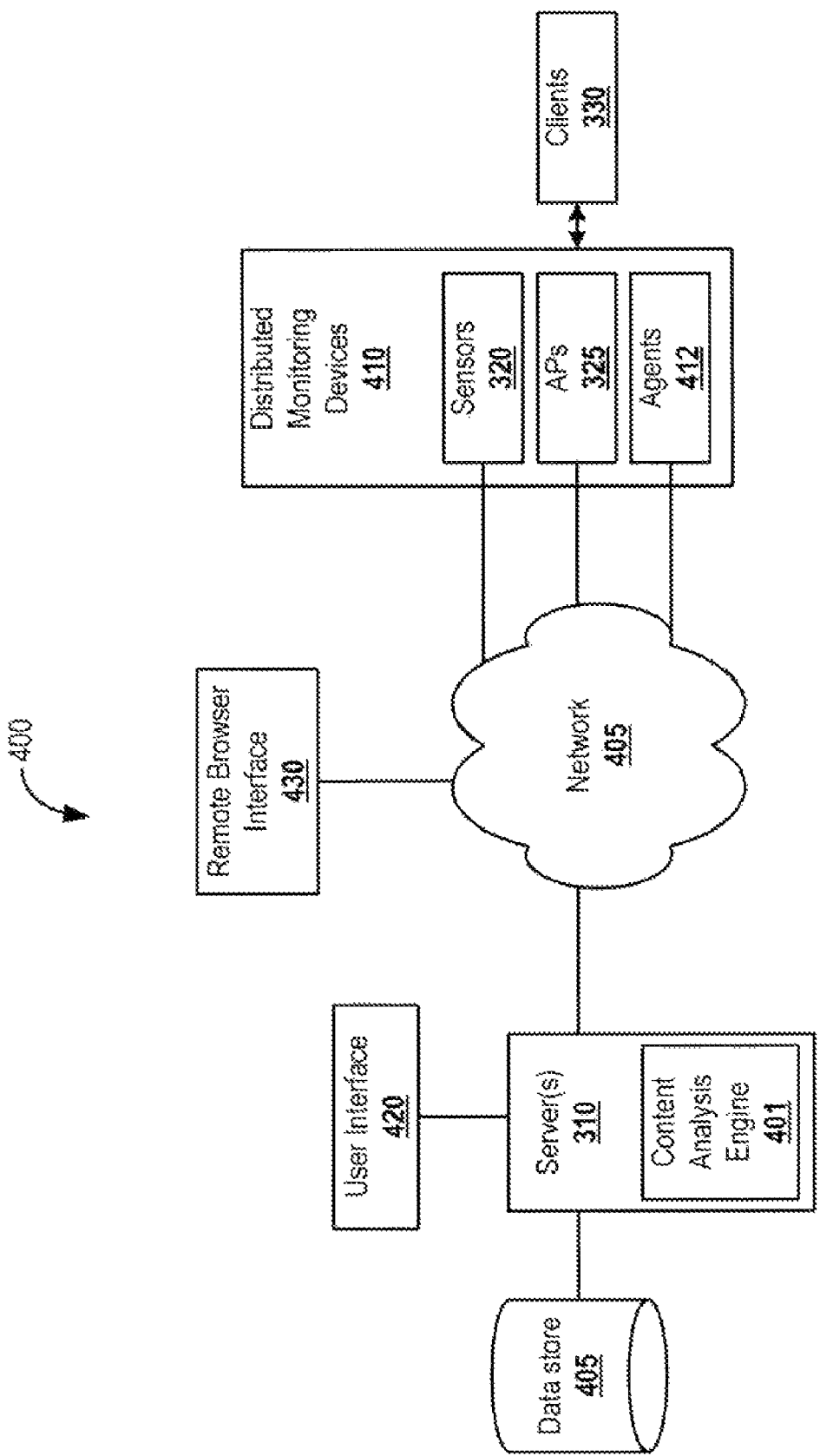
FIG. 4 is a block diagram of a wireless network including a server(s) equipped with a content analysis engine.

FIG. 4 is a block diagram of a wireless network 400 including a server(s) 310 equipped with a content analysis engine 401 according to an exemplary embodiment of the present disclosure. The wireless network 400 includes distributed monitoring devices 410 coupled to a network 405 which may include an IP network such as the Internet, a LAN, a WAN, or a VPN. Clients 330 access the wireless network 400 through APs 325 distributed throughout a physical infrastructure.

The distributed monitoring devices 410 are configured to monitor data, events, and statistics on the wireless network 400 and to communicate to the server(s) 310. Examples of distributed monitoring devices 410 include sensors 320, APs 325, and software agents 412. Sensors 320 are configured to provide dedicated monitoring of the wireless network 400. APs 325 can be configured to provide occasional monitoring while not actively communicating to clients 330 on the wireless network 400. For example, APs 325 can be configured to provide periodic statistics to the server(s) 310. For example, distributed monitoring devices 410 can be configured to analyze and communicate frame length statistics and directions to the server(s) 410.

Software agents 412 can be installed on clients 330 to enable the client 330 to monitor the wireless network 400 periodically. An example of the software agent 412 is software installed on clients 330 to provide part-time monitoring such as described in detail by U.S. patent application Ser. No. 11/276,925 entitled "SYSTEMS AND METHODS FOR WIRELESS SECURITY USING DISTRIBUTED COLLABORATION OF WIRELESS CLIENTS" filed Mar. 17, 2006, which has been incorporated by reference. Another example of the software agent 416 can be a wireless packet capture program which is configured to capture packets from the wireless network automatically or manually. An example wireless packet capture program is Kismet (available from Kismet Wireless, www.kismetwireless.net).

The wireless network 400 can include multiple APs 325 geographically distributed and corresponding sensors 320 and agents 412 distributed with the APs 325. For example, a company can implement the wireless network 400 globally and connect all the distributed monitoring devices 410 to server(s) 310 located at a network monitoring site.

The server(s) 310 is configured to receive data, events, and statistics from multiple distributed monitoring devices 410. The server(s) 310 can connect to the distributed monitoring devices 410 through the network 305. The server(s) 310 can be configured to correlate and aggregate data, events, and statistics from the distributed monitoring devices 410 and to detect attacks and event, alarms, performance degradation, and network policy compliance based on the correlation and aggregation.

The server(s) 310 can be connected to a data store 405 via, for example, a direct connection (e.g., internal hard-drive, universal serial port bus (USB)) or a network connection (e.g., Ethernet). The data store 405 can provide an efficient methods and systems to store and retrieve statistics, states, events, and alarms. The data store 405 in various examples may be an internal hard-drive, an external hard-drive, a network-attached file server, or any other data storage device.

In an example embodiment of the present disclosure, the server(s) 310 include a content analysis engine 401. The content analysis engine 401 is configured to analyze wireless frames transmitted on the wireless network 400 to determine the content of the frames without detailed inspection of the frame contents and with encrypted frames. The engine 401 can use statistical pattern matching with regards to the frame lengths to compare the monitored frame lengths to known patterns stored in the data store 405.

The distributed monitoring devices 410 can be configured to provide frame lengths according to the transmitting and receiving client 330 or AP 325. The server(s) 310 can analyze these frame lengths as they are received or store them in a log file in the data store 405 for later processing.

Additionally, the server(s) 310 include a user interface 420 and a remote browser interface 430. These interfaces 420, 430 can be used to access the functionality and control the server (s) 310 and to utilize the content analysis engine 401.

Figure 5:
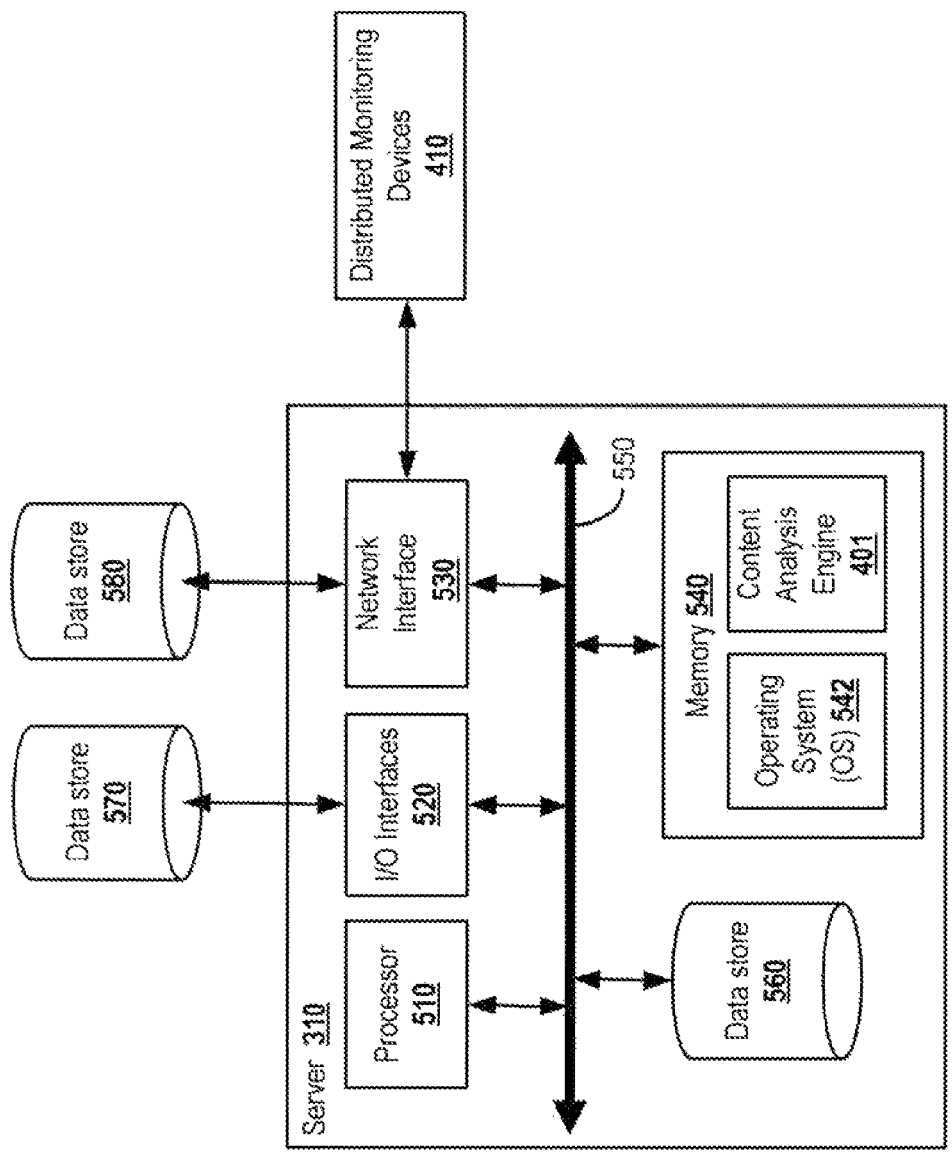
FIG. 5 is a block diagram depicting a server having a content analysis engine connected to a data store.

FIG. 5 is a block diagram depicting a server 310 having a content analysis engine 401 connected to a data store 560, 570, 580, according to an example of the present disclosure. The server 310 can be a digital computer that, in terms of hardware architecture, generally includes a processor 510, input/output (I/O) interfaces 520, network interfaces 530, and memory 540. The components (510, 520, 530, and 540) are communicatively coupled via a local interface 550. The local interface 550 can be, for example but not limited to, one or more buses or other wired or wireless connections. The local interface 550 can have additional elements, which are omitted for simplicity, such as controllers, buffers (caches), drivers, repeaters, and receivers, among many others, to enable communications. Further, the local interface 550 can include address, control, and/or data connections to enable appropriate communications among the aforementioned components.

The processor 510 is a hardware device for executing software instructions. The processor 510 can be any custom made or commercially available processor, a central processing unit (CPU), an auxiliary processor among several processors associated with the server 310, a semiconductor-based microprocessor (in the form of a microchip or chip set), or generally any device for executing software instructions. When the server 310 is in operation, the processor 510 is configured to execute software stored within the memory 540, to communicate data to and from the memory 540, and to generally control operations of the server 310 pursuant to the software instructions.

The I/O interfaces 520 can be used to receive user input from and/or for providing system output to one or more devices or components. User input can be provided via, for example, a keyboard and/or a mouse. System output can be provided via a display device and a printer (not shown). I/O interfaces 520 can include, for example, a serial port, a parallel port, a small computer system interface (SCSI), an infrared (IR) interface, a radio frequency (RF) interface, and/or a universal serial bus (USB) interface.

The data store 560, 570, 580 can be used to store alarms, events, data, state, and statistics that the server 310 receives or analyzes from devices monitoring a wireless network. The data store 560, 570, 580 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store 560, 570, 580 can incorporate electronic, magnetic, optical, and/or other types of storage media.

In one example, a data store 560 can be located internal to the server 310 such as, for example, an internal hard drive connected to the local interface 550 in the server 310. Additionally in other examples, the data store 570 can be located external to the server 310 such as, for example, an external hard drive connected to the I/O interfaces 520 (e.g., SCSI or USB connection). In yet other examples, the data store 580 can be connected to the server 580 through a network, such as, for example, a network attached file server.

The network interfaces 530 can be used to enable the server 310 to communicate on a network. The network interfaces 530 can include, for example, an Ethernet card (e.g., 10BaseT, Fast Ethernet, Gigabit Ethernet) or a wireless local area network (WLAN) card (e.g., 802.11a/b/g). The network interfaces 530 can include address, control, and/or data connections to enable appropriate communications on the network. The data store 580 and the distributed monitoring devices 410 can be connected to the server 310 through the network interfaces 530.

The memory 540 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 540 may incorporate electronic, magnetic, optical, and/or other types of storage media. Note that the memory 540 can have a distributed architecture, where various components are situated remotely from one another, and can be accessed by the processor 510.

The software in memory 540 may include one or more software programs, which can include an ordered listing of executable instructions for implementing logical functions. In the example of FIG. 5, the software in the memory system 540 includes the content analysis engine 401 and a suitable operating system (O/S) 542. The operating system 542 can control the execution of other computer programs, such as the content analysis engine 401, and provides scheduling, input-output control, file and data management, memory management, and communication control and related services. The operating system 542 may be any of WINDOWS/NT, WINDOWS 2000, WINDOWS/XP Server WINDOWS MOBILE (all available from Microsoft, Corp. of Redmond, Wash.), Solaris (available from Sun Microsystems, Inc. of Palo Alto, Calif.), or LINUX (or any other UNIX variant) (such as available from RedHat of Raleigh, N.C.).

The content analysis engine 401 is configured to implement systems and methods of the present disclosure. The content analysis engine 401 can analyze the content of wireless frames transmitted on the wireless network, and can be configured to operate as frames are received by the server 310 (e.g., in real-time) or on frame lengths stored in a log file the data store 560, 570, 580. The content analysis engine 401 analyzes the data link layer (e.g., OSI layer two) frame length statistics and frame direction to classify the content of the wireless frames. The engine 401 examines the frame lengths between two devices such as, for example, between a client and a gateway, between a client and another client, and between a client and an AP. The engine 401 then performs a statistical pattern match to known frame length patterns stored in the data store 560, 570, 580.

Different applications transmitting frames on a wireless network have different statistical signatures of their frame lengths and directions. These statistical signatures can be used to determine the content of the transmitted frames based on statistical matching to known patterns. These known patterns can exist during initialization of the application and unique events which demonstrate unique characteristics.

An analogy exists between encrypted wireless traffic and a long, flexible black tube. The black tube is not transparent similar to an encrypted wireless frame. As a client communicates with wireless frames over the network, it sends different frame lengths back and forth which can be thought of as different shaped and sized objects (e.g., squares, spheres, etc.) seen moving through the long, flexible black tube. The more the unique the shapes (e.g. differential between frame lengths), the easier it is to match to known patterns.

Known patterns can exist at the start of an application with the commencement of an update/poll or authentication handshake and in the middle of the data stream (e.g. continuous stream demonstrating similar packet sizes). Types of traffic that can be detected using known patterns include and not limited to, TCP, UDP, and ICMP.

The content analysis engine 401 includes known statistical patterns stored in the data store 560, 570, 580. These patterns are derived from experimentation by matching patterns to known applications. The engine 401 uses these known patterns to perform a statistical matching to determine the specific application. The known patterns can be updated in the data store 560, 570, 580 as new patterns become associated with various applications (both applications that already have patterns associated with them and applications that previously had not been associated with any patterns). It should be understood that multiple patterns can be associated with a single application.

The engine 401 can be used to determine frame content of encrypted wireless frames. The engine 401 is capable of detecting matches across various encryption techniques such as WEP, TKIP, AES, WPA-TKIP, and WPA2-AES. The engine 401 is configured to operate on all encryption methods and techniques described in IEEE 802.11i, each of which have been incorporated herein by reference. Further, the engine 401 can detect matches in unencrypted frames without requiring detailed inspection of the frame body.

Figure 6:
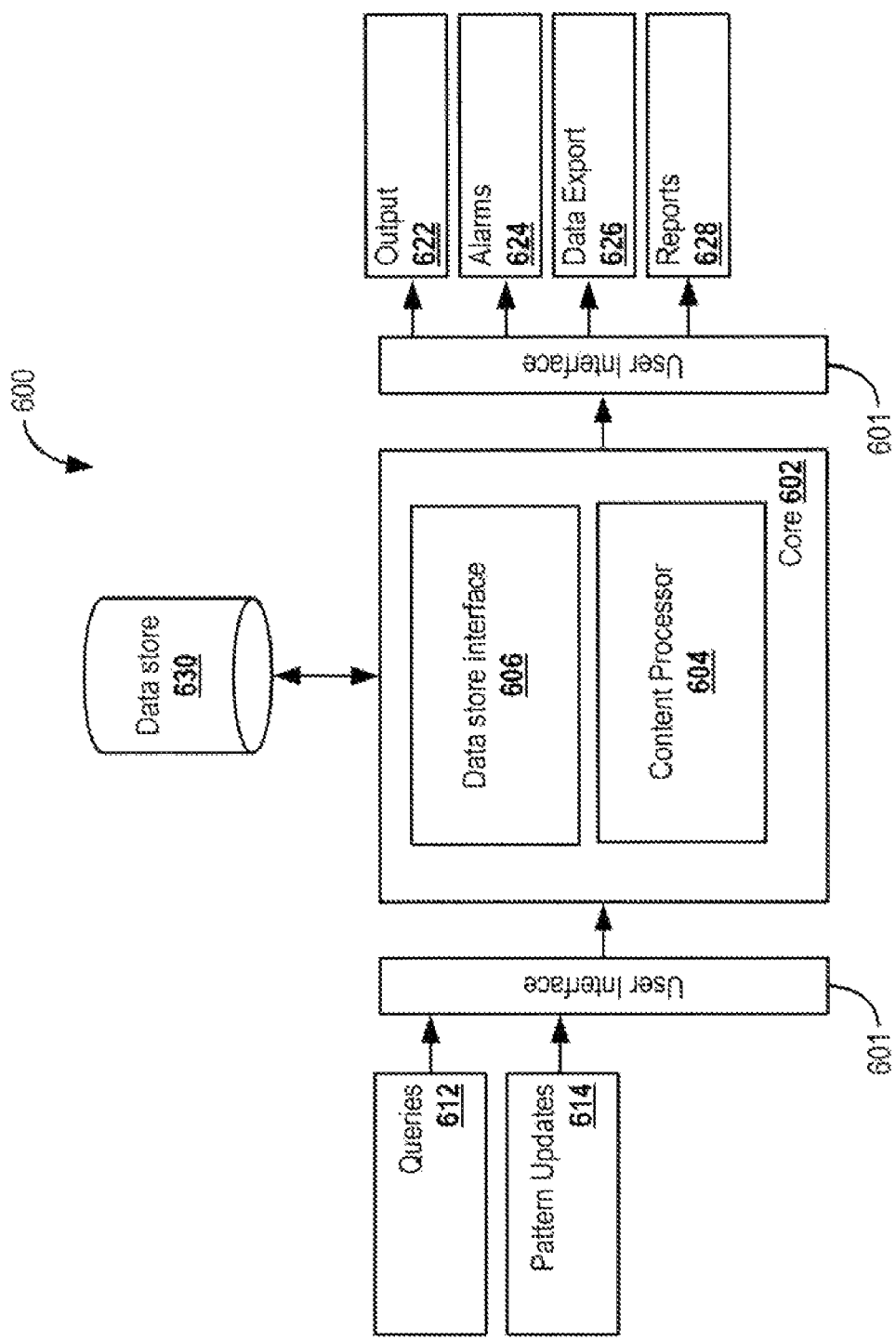
FIG. 6 is a block diagram depicting a content analysis engine for determining content of wireless frames responsive to the statistical frame length pattern.

FIG. 6 is a block diagram depicting an exemplary embodiment of a content analysis engine 600 for determining content of wireless frames responsive to the statistical frame length pattern according to an embodiment of the present disclosure. The engine 600 includes a core 602 and a user interface 601. The core 602 includes a content processor 604 and a data store interface 606 coupled to a data store 630. The data store 630 is a data storage device and can include, for example, a hard drive or network-attached file storage. The data store 630 is configured to store statistical frame length patterns and logs of the frames transmitted on a wireless network.

The data store interface 606 is configured to retrieve and store data in the data store 630. For example, the data store interface 606 can update the statistical frame length patterns responsive to a pattern update 614 received by the user interface 601. Additionally, the data store interface 606 can retrieve logs of the frames transmitted on the wireless network responsive to queries 612 from the user interface 601. Example queries 612 can include a manual request to determine the content of a client's transmission on the wireless network and an automated request to determine the content responsive to defined policy.

The content processor 604 can receive the logs from the data store interface 606 responsive to queries 612. The content processor 604 is configured to perform statistical pattern matching on the logs to analyze the frame lengths of frames transmitted between two devices on the wireless network. The processor 604 determines the content of the frames responsive to matches based on statistical frame length patterns preloaded in the data store 630. Additionally, the content processor 604 can operate in real-time as frame lengths are provided to the data store interface 606.

The output 622 includes a determination of the content of wireless frames between two devices on the wireless network. For example, the output 622 can be that client A with MAC address 00:11:09:08:CD:CF and IP address 192.168.0.100 is performing an anti-virus update with AVG Anti Virus Free Version 7 (available from Grisoft, Inc. of Millburn, N.J.).

The content analysis engine 600 can be configured to provide alarms 624 responsive to a determination that a client is operating an unauthorized application. For example, an alarm 624 can be raised when a client is operating a peer-to-peer file sharing application over the wireless network. Further, the alarm 624 can be used by a wireless intrusion prevention system (WIPS) to direct a sensor of the WIPS to terminate the client using over the air techniques such as, for example, those described in detail by U.S. patent application Ser. No. 10/161, 443 entitled "METHOD AND SYSTEM FOR ACTIVELY DEFENDING A WIRELESS LAN AGAINST ATTACKS" filed Jun. 3, 2002, which has been incorporated by reference, or wired side blocking techniques preventing the device from accessing the network (e.g., port suppression, network admission control (NAC), etc.).

The engine 600 can provide data export 626 and reports 628 from the user interface 601. Data export 626 can be sent to the data store 630, another data store, or to a wireless security system such as a WIPS. Reports 628 can be run automatically or manually to determine the usage of the wireless network and provide statistics as to the popular uses of the network.

FIG. 7 is a block diagram depicting an example statistical pattern 700 according to an exemplary embodiment of the present disclosure. The pattern 700 is used to identify the content of wireless frames based on known values of frame lengths. The pattern 700 includes multiple frames 701, 702, 703 each includes a specific value for frame length 710, size drift 720, and direction 730. Other example patterns can be developed solely of frame length 710 and direction 730.

The size drift 720 is an allowed difference from the frame length 710 value. The size drift 720 accounts for slight variations in frame lengths based on different wireless hardware configurations and network operating conditions. Size drift 720 can occur in smaller sized frames (e.g. less than 100 bytes). For example, a standard ACK frame is 84 bytes, but can increase up to 90 bytes due to increased sequence numbers or increased delay/timestamps in the frame. Larger frames are generally more stable in size since they do not contain dynamic information. Size drift 720 for a particular frame 701, 702, 703 can be zero indicating the frame length 710 matches exactly or a percentage value which the frame length 710 can vary and still be considered a match.

Direction 730 indicates the direction each frame 701, 702, 703 in the pattern 700 is transmitted. Examples can include client to host, host to client, client to broadcast address, host to broadcast address, client to client, or host to host. Finally, each pattern 700 includes a frame count scope (FCS) 740. The FCS 740 is the number of frames in which there should be a pattern match. For example, an AVG antivirus update pattern can have a FCS 740 of 20 frames. Here, the frame lengths 720 of frames 701, 702, 703 should occur within 20 frames for a positive statistical pattern 700 match. In the case where a client or host has multiple programs operating and does not transmit frames in an ordered sequence, the FCS 740 compensates by allowing multiple frames to be observed without breaking the detection. The FCS 740 operates similarly to a counter which is decremented each time it analyzes a frame which does not match the frame pattern 700. Once the FCS 740 has reached zero, then there have been too many frames transmitted to correctly identify the application, or the frame which initially triggered the start of the pattern 700 match originated from a different application not matching the pattern 700.

FIGS. 8A-8B are flowcharts depicting operational scenarios for determining and updating known statistical patterns. FIG. 8A is a flowchart depicting an operational scenario 800 for determining statistical patterns. FIG. 8B is a flowchart depicting an operational scenario 810 for updating known statistical patterns in a data store.

In FIG. 8A, operational scenario 800 for determining statistical patterns starts, as depicted in step 801. A wireless application is initialized on a hardware configuration, as depicted in step 802. The wireless application can be operated on a wireless client or a wireless AP. Wireless applications can be any programs which require network transmissions such as, for example, antivirus updates, streaming music or videos, instant messaging, among others. The hardware configuration includes a set of wireless devices such as a wireless AP, a wireless client card, among others.

The frame size patterns are analyzed based on the hardware configuration, as depicted in step 803. As shown in FIG. 7, frame size patterns include multiple frames each with a specific length and direction between the nodes. In operational scenario 800, the frame size patterns are analyzed based on a known application on a specific hardware configuration. The values of the frame lengths are determined based on the direction of the frames.

In step 804, the frame size pattern can be analyzed on a new hardware configuration by initiating the wireless application on the new hardware configuration, as depicted in step 802. Frame size patterns are analyzed on multiple hardware configurations to ensure frame lengths match across the different hardware configurations, and if not, to account for frame size drift in the frame size pattern.

In step 804, if no new hardware configuration is available, then in step 805, the statistical pattern is determined responsive to the frame size patterns analyzed on multiple hardware configurations. The statistical pattern as shown in FIG. 7 include a frame size, a direction, and a frame size drift for each frame. The frame size drift is determined based on the variances in frame sizes across different hardware configurations.

In FIG. 8B, operational scenario 810 for updating known statistical patterns starts, as depicted in step 811. Scenario 810 provides a mechanism for updating the statistical patterns determined with respect to operational scenario 800 by sending the statistical patterns to a data store for content matching. A connection to a data store is established, as depicted in step 812. The data store includes electronic storage for storing known statistical patterns used to match against frame lengths to determine the content of tire frames. The connection can include a network connection such as ethernet or a direct connection such as an attached storage device to a computer (such as, e.g., USB flash, external hard drive, etc.).

New frame size patterns are updated in the data store, as depicted in step 813. New frame size patterns are discovered with new applications and with new hardware configurations. These new patterns can be updated periodically (regularly or irregularly) as the new frame size patterns are discovered. In step 814, the new frame size patterns are loaded in the data store.

Figure 9A:
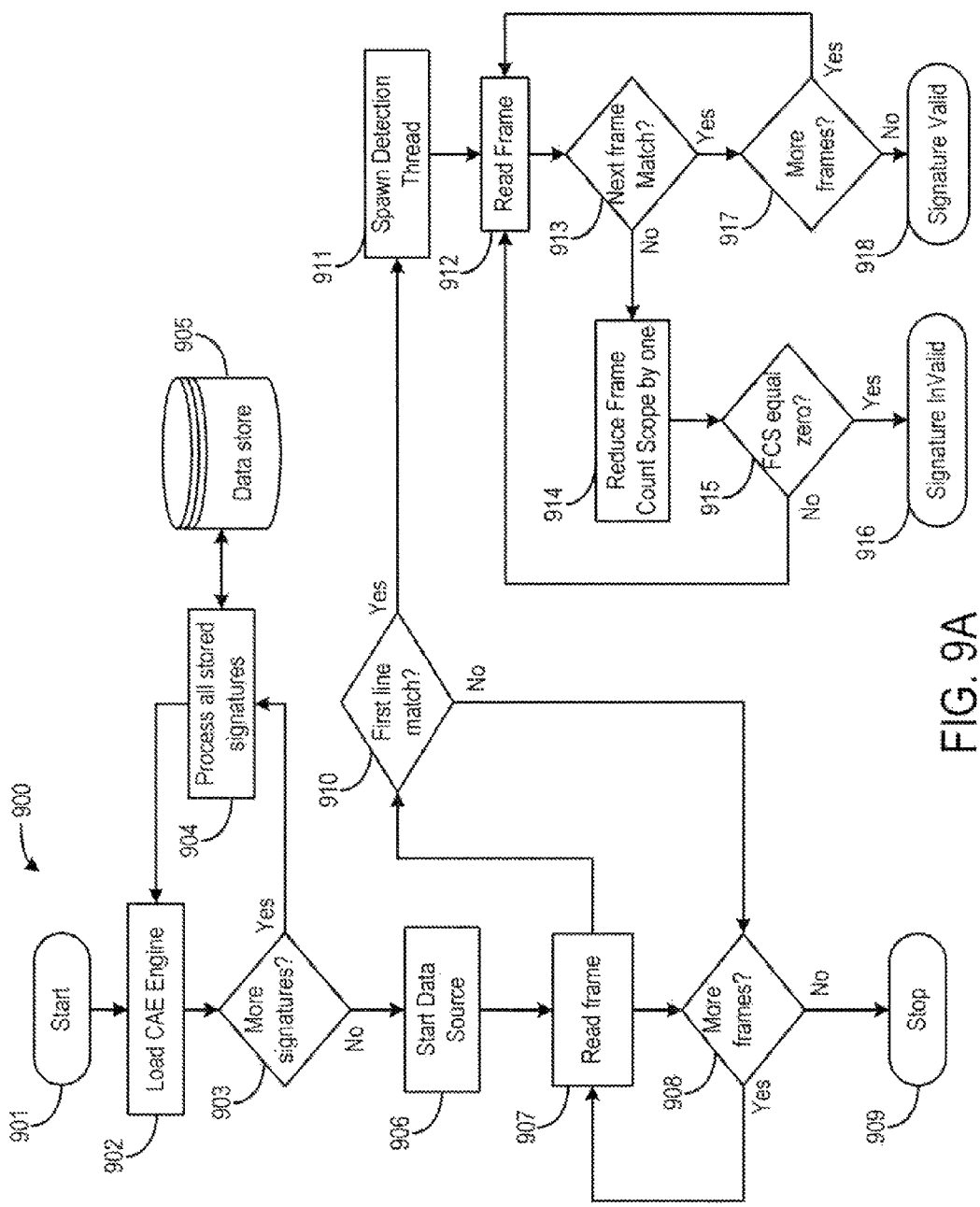
FIGS. 9A-9B are flowcharts depicting operational scenarios for matching and logging wireless frames on a wireless network to stored patterns to determine the content of the wireless frames.
Figure 9B:
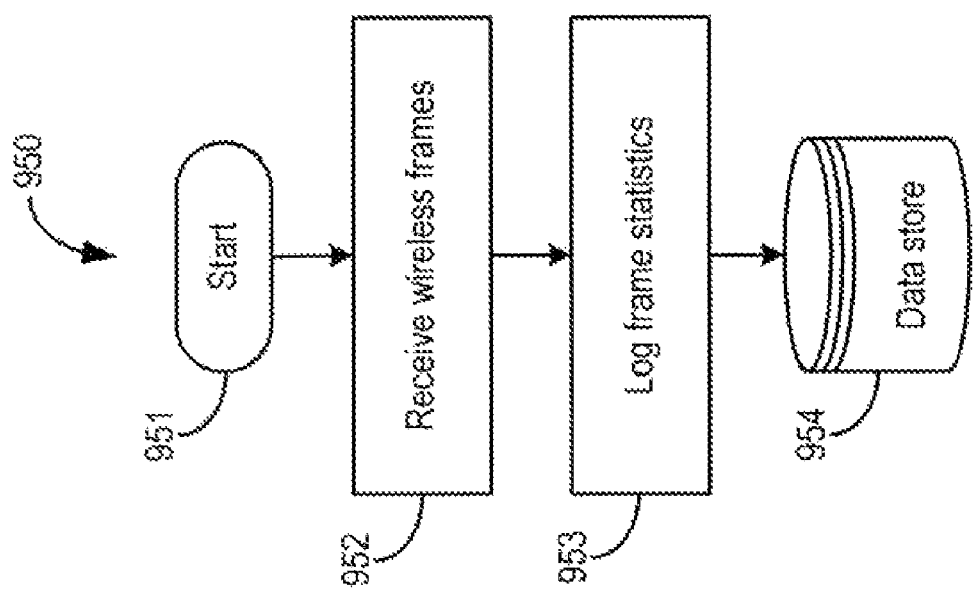

FIGS. 9A-9B are flowcharts depicting operational scenarios for matching and logging wireless frames on a wireless network to stored patterns thereby determining an application associated with the content of wireless frames. FIG. 9A is a flowchart depicting an operational scenario 900 of a content analysis engine (CAE) configured to match the signature of a series of frame sizes to stored statistical patterns. FIG. 9B is a flowchart depicting an operational scenario 950 for logging received wireless frame sizes in a data store.

In FIG. 9A, operational scenario 900 is an exemplary content analysis engine (CAE) configured to match the signature of the frame lengths of wireless frames to stored patterns. The CAE can determine the application associated with the content of wireless frames without inspecting the frame body thereby allowing visibility to encrypted frames. Scenario 900 starts, as depicted in step 901. The CAE is loaded, as depicted in step 902. The CAE can be run on a computer such as a laptop or desktop computer. Additionally, the CAE can be run on a wireless intrusion prevention system (WIPS) server. Further, the CAE can be loaded for a specific analysis or it can operate continuously.

In step 903, the CAE checks to determine if it has retrieved all the signatures from a data store 905. If the CAE has more signatures to process, then it processes all the stored signatures in the data store 905, as depicted in step 904. Signatures can be known statistical patterns such as the frame size pattern 700 depicted in FIG. 7. Signatures are used by the CAE to match to observed frame length patterns to determine the application associated with the content of the observed frames.

If the CAE has processed all the store signatures in step 903, then the CAE starts the data source, as depicted in step 906. The data source is configured to receive wireless frames either from live frames transmitted on a wireless network or from a log file. In the case of receiving frames live off the wireless network, the CAE can be coupled to a monitoring system which receives frame lengths and directs the CAE to determine the content of the frames. For example, a wireless intrusion prevention system (WIPS) can include a CAE to determine frame content while operating to monitor and prevent wireless intrusions. The CAE in this example can be used to determine the type of application run by rogue devices or to determine if unauthorized applications are being run by authorized clients. In the case of a log file, the CAE can parse the frame lengths from previous captures to determine the frame content.

The CAE reads the frame, as depicted in step 907. In step 908, the CAE continues to read frames until there are no more frames left in which case the CAE stops, as depicted in step 909. After each frame is read in step 907, the CAE performs a first line match to the stored signatures, as depicted in step 910. The first line match looks to see if the frame read in step 907 matches the length of the initial frame in any of the stored signatures. The first line match in step 910 can be threaded to do multiple detections on multiple signatures at once. If no match is detected of the first line in step 910, then the CAE looks for more frames as depicted in step 908.

Once a first line match is detected is step 910 between two nodes on the network, then the detection thread is spawned, as depicted in step 911. Each detection thread reads from the same source as the CAE. The detection thread is configured to continue the detection until a frame count scope (FCS) is reached. The FCS is depicted in FIG. 7 and it represents a timeout value associated with each signature. The detection thread reads the next frame, as depicted in step 912. The next frame represents the next frame transmitted between the two nodes found. For example, a client and a host may have a first line match of the frames transmitted between them. The detection thread analyzes subsequent frames between the client and the host to determine if subsequent frames match the signature and this continues until the FCS value is reached. Further, multiple detection threads can operate at once.

After the next frame is read between the two nodes in step 912, the detection thread checks to see if the next frame matches the signature, as depicted in step 913. If the next frame does not match in step 913, then the detection thread reduces the FCS by one as depicted in step 914. The detection thread then checks to see if the FCS has reached zero in step 915. If the FCS is zero, then the signature is invalid and no match has occurred, as depicted in step 916. If the FCS is not zero, then the detection thread reads the next frame between the two nodes in step 912.

If the next frame does match the next line in the signature in step 913, then the detection thread checks to see if there are more frames in the signature as depicted in step 917. If there are more frames in the signature in step 917, then the detection thread goes to step 912 to read the next frame. If there are no more frames in step 917, then the signature is a valid match, as depicted in step 918.

In steps 916 and 918, the CAE determines if a signature in valid or invalid and takes appropriate actions such as, for example, providing notification or alarms, directing a secondary system to take action, storing data in a log file, and updating statistics. With regards to the secondary system, the CAE can provide the results of the detection thread to allow a wireless intrusion protection system (WIPS) to terminate a wireless node responsive to running a specific application.

In addition to the frame matching techniques of operation scenario 900 in FIG. 9A, other advanced probabilistic/statistical techniques such as distribution analysis, cross-correlation, matched filtering, regression analysis, maximum likelihood techniques, among others can be used to match monitored frame lengths to known patterns.

In FIG. 9B, operational scenario 950 for storing wireless frame statistics to a log file starts, as depicted in step 951. Wireless frames are received, as depicted in step 952. Wireless frames can be received from a system monitoring a wireless network, such as a WIPS, or from a frame capture program coupled to a wireless radio. The frame statistics are logged, as depicted in step 953. Finally, the frames statistics for each frame received from the wireless network are stored in a data store, as depicted in stop 954. Frame statistics can include destination and source address, frame length, encryption, frame inter-arrival times, among others. In an example embodiment, the data store includes a log file with frames listed along with destination and source address, the frame length, and the frame arrival time. This log file can be read by a content analysis engine to determine an application associated with the content of the wireless frames based on the statistical patterns of frame sizes.

Figure 10:
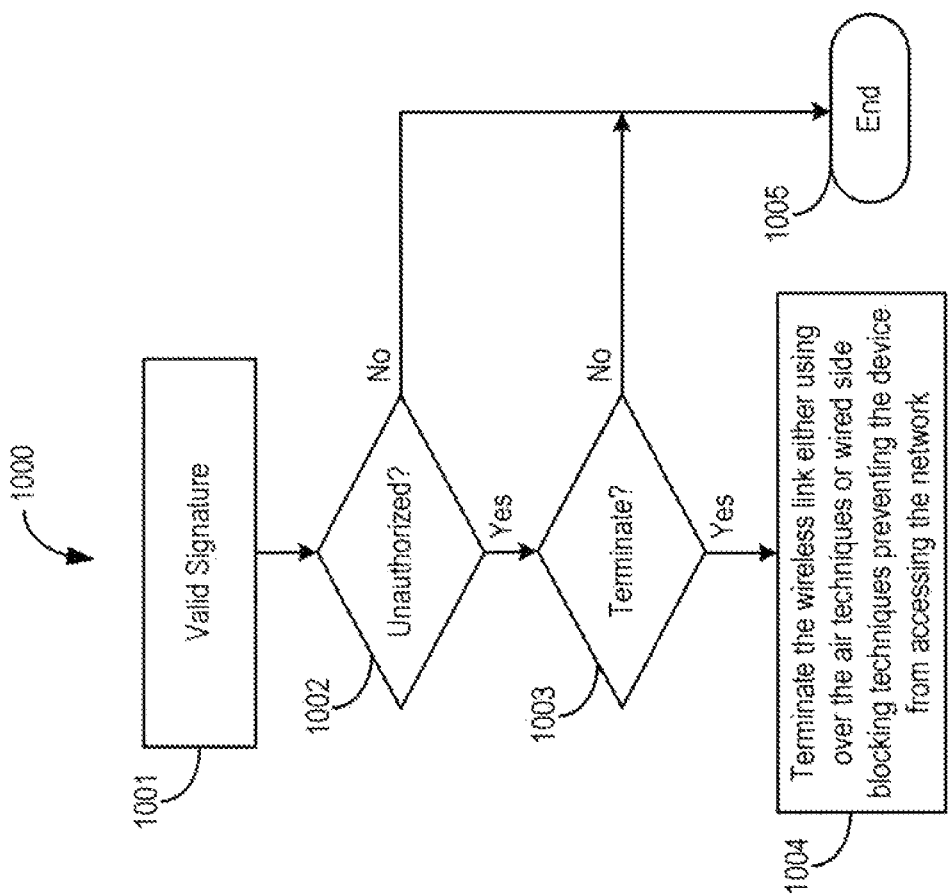
FIG. 10 is a flowchart depicting an operational scenario which utilizes a wireless intrusion prevention system (WIPS) to terminate a wireless link responsive to a valid signature.

FIG. 10 is a flowchart depicting an exemplary operational scenario 1000 of utilizing a wireless intrusion prevention system (WIPS) to terminate a wireless link responsive to a valid signature. For example, a WIPS can include a content analysis engine configured to determine the content of wireless frames. Responsive to a valid signature, the WIPS can take appropriate action such as termination of the link.

Scenario 1000 starts with receiving a valid signature, as depicted in step 1001. The valid signature is a match based on matching statistical known frame length patterns to observed frame lengths. The signature provides the application being run over the wireless link. In step 1002, the signature is checked to see if it is an authorized or unauthorized application. If the signature is authorized, then scenario 1000 ends, as depicted in step 1005. If the signature is unauthorized, then the scenario 1000 determines whether or not it should terminate the link, as depicted in step 1003. Termination can be based on wireless network policy. For example, the policy can provide termination of any peer-to-peer file sharing applications which are considered unauthorized. In another example, the policy can provide that music streaming applications are unauthorized, but should not be terminated.

If the policy provides for termination, then the wireless link is terminated either using over-the-air techniques or wired side blocking techniques preventing the device from accessing the network, as depicted in step 1004. An example of over-the-air termination techniques are described in detail by U.S. patent application Ser. No. 10/161,443 entitled "METHOD AND SYSTEM FOR ACTIVELY DEFENDING A WIRELESS LAN AGAINST ATTACKS" filed Jun. 3, 2002, which has been incorporated by reference.

Figure 11A:
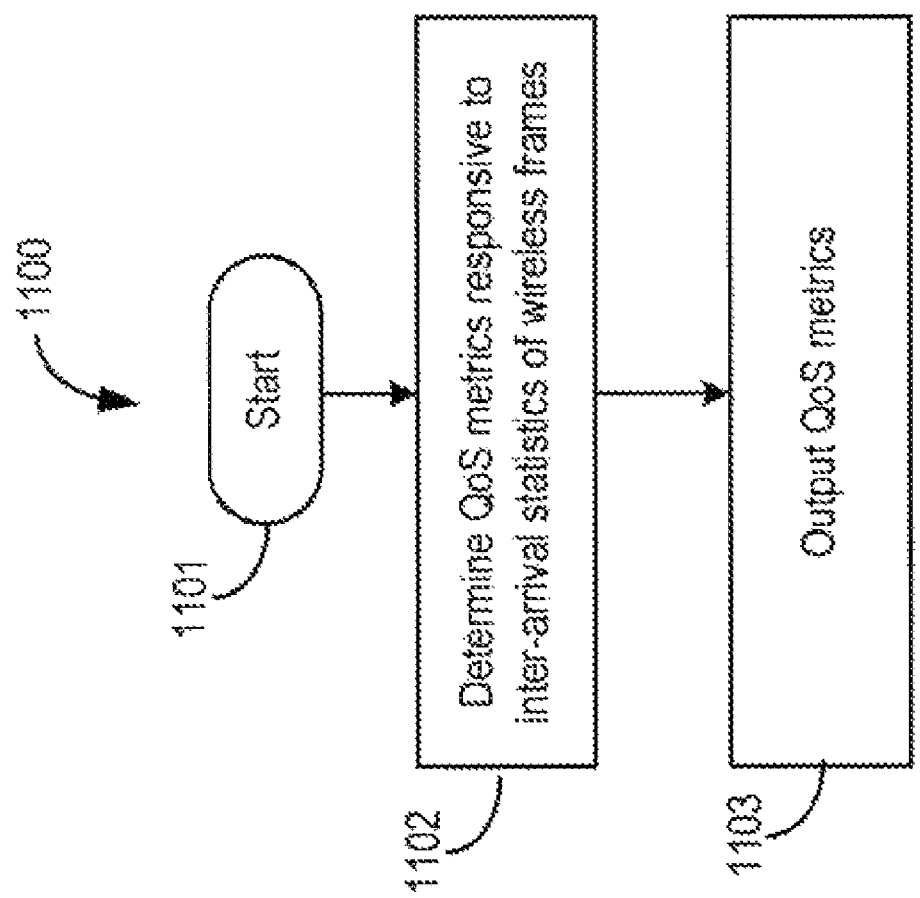
FIGS. 11A-11B are flowcharts depicting operational scenarios for determining quality-of-service (QoS) metrics of wireless frames without detailed packet inspection.
Figure 11B:
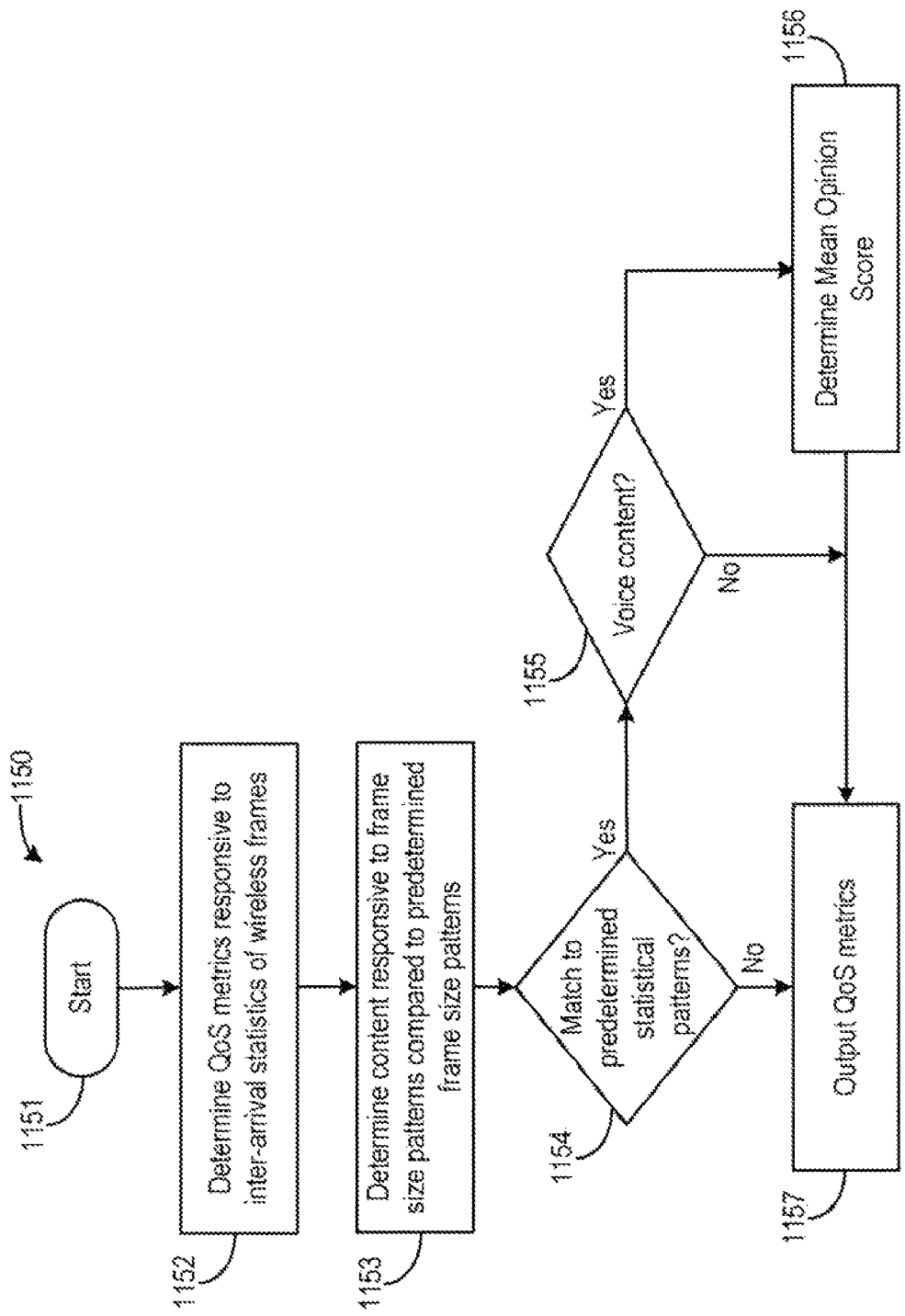

FIGS. 11A-11B are flowcharts depicting operational scenarios for determining quality-of-service (QoS) metrics of wireless frames without detailed packet inspection. FIG. 11A is a flowchart depicting an operational scenario 1100 for determining quality-of-service (QoS) metrics of wireless frames. Scenario 1100 starts, as depicted in step 1101. QoS metrics are determined responsive to inter-arrival statistics of wireless frames, as depicted in step 1102. QoS metrics can include frame error rate, frame to frame jitter, and latency. These metrics can be determined without detailed inspection of the frame body of the wireless frames. The QoS metrics are output, as depicted in step 1103.

FIG. 11B is a flowchart depicting an exemplary operational scenario 1150 for determining quality-of-service (QoS) of voice over 802.11. Scenario 1150 starts, as depicted in step 1151. QoS metrics are determined responsive to inter-arrival statistics of wireless frames, as depicted in step 1152. QoS metrics can include frame error rate, frame to frame jitter, and latency. These metrics can be determined without detailed inspection of the frame body of each of the wireless frames. The content of the wireless frames is determined responsive to the frame size patterns compared to known statistical frame size patterns, as depicted in step 1153. This determination can be made based upon the method of FIG. 9A.

If a match is found to a known statistical pattern in step 1154, then step 1155 determines if the match is voice content. Voice content can include voice over 802.11. If no matched to known statistical patterns is found in step 1154 or if no voice content is found in step 1155, then QoS metrics are output as depicted in step 1157. If the frames are voice content, then the mean opinion score (MOS) is determined, as depicted in step 1156. MOS is a numerical indication of the perceived quality of received human speech over the connection. Even though MOS is a subjective measurement, MOS can be determined using frame statistics such as frame error rate, frame to frame jitter, and latency. Specifically, the ITU-T legacy E-Model, which is hereby incorporated by reference, can be adapted for packet networks such as a wireless network to calculate MOS from frame statistics. After determining the MOS in step 1156, the QoS metrics are output in step 1157.

Figure 12:
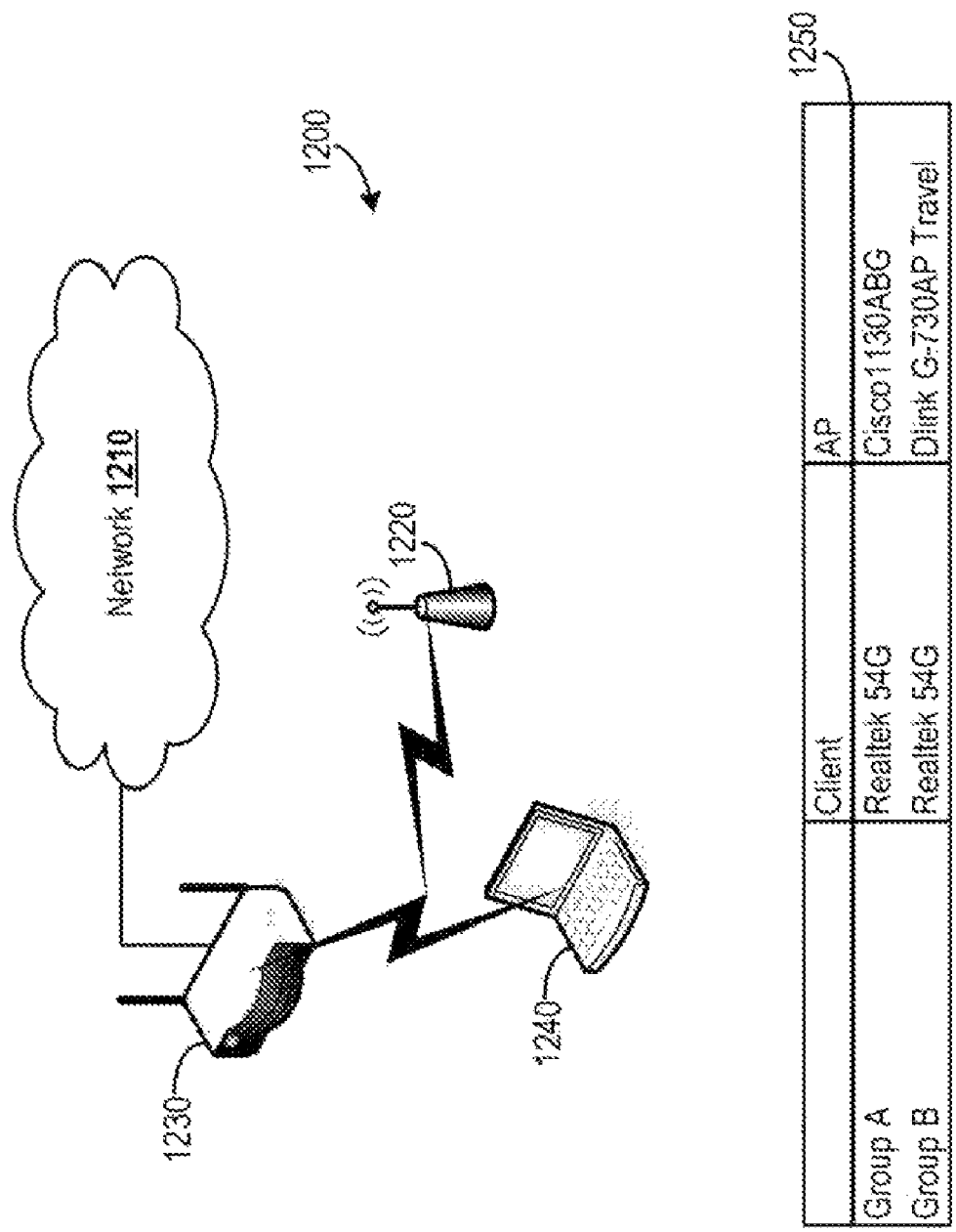
FIG. 12 is a wireless network setup for determining statistical patterns of frame lengths.

FIG. 12 depicts an example wireless network 1200 for determining statistical patterns of frame lengths. The wireless network 1200 includes a client 1240, an AP 1230, and a sensor 1220. Table 1250 includes two different hardware configurations of the wireless network 1200. Group A includes the client 1240 equipped with a wireless LAN interface controller from Realtek (available from Realtek Semiconductor Corp. of Hsinchu, Taiwan) and the AP 1230 is a Cisco 1130a/b/g (available from Cisco Systems of San Jose, Calif.). Group B includes the client 1240 equipped with a wireless LAN interface controller from Realtek (available from Realtek Semiconductor Corp. of Hsinchu, Taiwan) and the AP 1230 is a D-Link G-730AP Travel AP (available from D-Link Systems, Inc. of Fountain Valley, Calif.).

The sensor 1220 can include any device capable of monitoring frames transmitted on the wireless network 1200. For example, the sensor 1220 can be an AirDefense sensor (available from AirDefense, Inc. of Alpharetta, Ga.). Additionally, the sensor 1220 can include a client equipped with a wireless device and software configured to capture wireless data transmitted on the network. The sensor 1220 is configured to monitor the frames transmitted on the network 1200 and to capture the relevant data such as the source and destination address and the frame length.

Patterns are determined by running known applications on the client 1240 and monitoring with the sensor 1220 to determine the frame lengths of the frames transmitted to and from the AP 1230. This is done on both the hardware configurations of group A and group B to ensure slight variations in frame length due to different hardware can be adjusted for in developing the statistical patterns.

FIGS. 13A-13F are tables illustrating example applications and their associated patterns of frame lengths. The frame length patterns were determined using the wireless network 1200 of FIG. 12 for both hardware configurations in group A and group B to ensure similarity of the patterns across different hardware configurations. Each table in FIGS. 13A-13F includes a field for the specific application, a source field and destination field to denote the direction of the frame, the frame size for Group A and for Group B hardware configurations in bytes, the difference in frame size between Group A and Group B, the difference provided as an error percentage, and the number of packets required to determine the pattern. The source and destination fields include a "C" to denote the client and a "GW" to denote the gateway which in these examples is the AP.

FIG. 13A illustrates an example pattern of an antivirus update with AVG version 7.0, free edition (available from Grisoft, Inc. of Millburn, N.J.). The pattern begins with an initial 394 length frame sent from the client to the gateway. A second frame is sent of length 90 in group A and length 84 in group B from the gateway to the client. This is followed by a third frame sent of size 228 from the gateway to the client. Fourthly, a frame is sent of length 90 in group A and length 84 in group B from the gateway to the client. Finally, a frame is sent of length 84 from the client to the gateway. This pattern shows only a 6 length difference between in the second and fourth frames between the hardware configuration of group A and B which represents only an error of 1.37%. The pattern of FIG. 13A was determined over a capture of 20 packets on the wireless network.

FIG. 13B illustrates an example pattern of Google Earth (available from Google, Inc. of Mountain View, Calif.). The pattern includes an initial 499 length frame sent from the client to the gateway. A second frame is sent of length 539 front the gateway to the client, and a third frame is sent of length 519 from the client to the gateway. Finally, a fourth frame is sent of length 1444 from the gateway to the client. The pattern shows no difference in frame length between the hardware configurations of group A and B. The pattern of FIG. 13B was determined over a capture of 15 packets on the wireless network.

FIG. 13C illustrates an example pattern of Winamp Shoutcast (available from America Online, Inc. of Dulles, Va.). The pattern includes a frame sent from the client of length 1364 to the gateway and a second frame sent back to the client from the gateway of length 84. The pattern shows no difference in frame length between the hardware configurations of group A and B. The pattern of FIG. 13C was determined over a capture of 5 packets on the wireless network.

FIG. 13D illustrates an example pattern of OpenVPN SSL (available from OpenVPN Solutions LLC of Boulder, Colo.). The pattern includes an initial 92 length frame sent from the client to the gateway. Subsequently, frames are sent from the gateway to the client and then vice versa with frame lengths of 92, 84, 128, and 128 respectively. The sixth frame is from the gateway to the client and has a length of 90 using the group A hardware configuration and a length of 84 using the group B hardware configuration. This is the only difference in frame length leading to an error percent between hardware configurations of 0.97%. The seventh and eighth frames have a length of 140. The pattern of FIG. 13D was determined over a capture of 50 packets on the wireless network.

FIG. 13E illustrates an example pattern of Trillian instant messenger (available from Cerulean Studios, LLC of Brookfield, Conn.). The pattern includes an initial frame of length 92 sent front the client to the gateway. The second frame is sent from the gateway to the client is length 90 under the group A hardware configuration and length 88 under the group B hardware configuration. The next three frames are alternatively sent between the client and the gateway with respective lengths of 84, 94, and 94. The sixth frame is from the gateway to the client and has a length of 90 using the group A hardware configuration and a length of 84 using the group B hardware configuration. Finally, the seventh frame is from the client to the gateway with a length of 122. There are slight differences in frame lengths between group A and B leading to a 1.26% error difference. The pattern of FIG. 13E was determined over a capture of 15 packets on the wireless network.

FIG. 13F illustrates example frame lengths of specific requests from a client such as an SMB local master request, an ARP request, and a DNS query. These frames lengths were determined with the group A hardware configuration. If a client is broadcasting a SMB local master request, it broadcasts a frame length of 299 to all stations. An ARP request from the gateway to a client is length 90. A DNS query starts with an initial frame length of 109 from the client to the gateway followed by a frame of length 162 from the gateway back to the client.

FIG. 14 is a table illustrating an example statistical frame pattern of an antivirus update with AVG version 7.0, free edition (available from Grisoft, Inc. of Millburn, N.J.). Statistical frame patterns can be developed for my wireless application and the pattern illustrated in FIG. 14 is an example embodiment of one such pattern. The statistical frame pattern includes a direction, a size drift percentage, a base frame size, an upper limit frame size, and a lower limit frame size. The size drift and corresponding upper and lower limits provide for a match to the pattern despite statistical differences in frame lengths which may occur due to different hardware or operating conditions.

The first frame in the pattern is from a client (C) to a gateway (GW) and it has a base frame size of 394 bytes. The first frame has no size drift and therefore the upper and lower frame size are both 394 bytes. The second frame is from the gateway to the client and it has a base frame size of 84 bytes. The size drift percentage for the second frame is 11% allowing for an upper frame size of 93 bytes and a lower frame size of 75 bytes. Accordingly, a second frame in size between 75 and 93 bytes would be a statistical match on the second frame after receiving a first frame of size 394.

The third frame in the statistical pattern is from the gateway to the client with a base size of 228 bytes. The third frame has no size drift and therefore the upper and lower frame sizes are 228 bytes. The fourth frame in the statistical pattern is from the gateway to the client with a base size of 84 bytes. The fifth frame in the statistical pattern is from the client to the gateway with a base size of 84 bytes. The size drift percentage for the forth and fifth frame is 11% allowing for an upper frame size of 93 bytes and a lower frame size of 75 bytes.

What is claimed is:

1. A method of determining an application associated with content of frames transmitted on a wireless network, the method comprising the steps of:
   associating one or more applications with one or more known statistical patterns;
   storing the known statistical patterns in a pattern data store with the associated application, wherein the known statistical patterns are utilized to determine the applications operating over the wireless network;
   monitoring a plurality of encrypted frames transmitted between nodes on the wireless network; and
   retrieving known statistical patterns from a pattern data store;
   matching the known statistical patterns to the frame lengths and direction between the nodes; and
   identifying an application associated with the content of frames transmitted on the network based upon a match between the known statistical patterns to the frame lengths and direction, the known statistical patterns being associated with the application.

2. The method of claim 1, further comprising the step of outputting an application type responsive to a match of a known statistical pattern based on the matching step, wherein each of the known statistical patterns corresponds to a different application type.

3. The method of claim 1, wherein the known statistical patterns each correspond to the unique frame length pattern of an application operating on the wireless network.

4. The method of claim 1, wherein the wireless network operates using an IEEE 802.11 protocol.

5. The method of claim 1, wherein a match of the known statistical pattern in the matching step occurs within a frame count scope, the frame count scope comprises a predetermined number of frames over which the monitoring step monitors frames on the wireless network for the matching step.

6. The method of claim 5, wherein the known statistical pattern comprises the frame count scope and one or more frames each with a corresponding frame length, frame drift size, and frame direction between nodes.

7. The method of claim 6, wherein the frame drift size is an allowed difference from the frame length and a frame length value within the frame drift size comprises a statistical match.

8. The method of claim 7, wherein the known statistical patterns are determined by operating an application on one or more test hardware configurations and analyzing the frame lengths, frame drift size, and direction.

9. The method of claim 8, wherein the unique pattern of frame lengths varies based on a statistical frame drift size responsive to hardware configuration and wireless network operating conditions.

10. The method of claim 8, wherein the application comprises a computer program operable to transmit and receive frames.

11. The method of claim 9, wherein the application is operable to transmit and receive encrypted frames.

12. The method of claim 10, further comprising the step of terminating an unauthorized application based on the matching step, the unauthorized application comprises an application defined against predetermined network policy.

13. The method of claim 10, further comprising the step of raising an alarm and responsive determining an unauthorized application based on the matching step.

14. The method of claim 10, further comprising the step of determining quality-of-service metrics of the application responsive to inter-arrival statistics of the plurality of frames.

15. The method of claim 10, further comprising the step of determining the mean opinion score responsive to matching the application to a voice application.

16. The method of claim 1, wherein the monitoring step is performed by sensors, access points, clients equipped with software agents, and combinations thereof.

17. The method of claim 16, wherein the matching step is performed by a computer connected to a data store loaded with the known statistical patterns.

18. The method of claim 17, wherein the sensors, access points, clients equipped with software agents, and combinations thereof are configured to perform statistical analysis and communicate the results of the statistical analysis to the computer.

19. The method of claim 17, wherein the data store is operable to be updated with new known statistical patterns.

20. The method of claim 19, wherein the computer comprises a wireless intrusion prevention server.

21. The method of claim 17, wherein the computer is operable to perform multiple of the matching step simultaneously.

22. A method for characterizing patterns of frame lengths corresponding to an application, the method comprising the steps of:
providing a first hardware configuration comprising a plurality of wireless devices;
operating the application on one of the wireless devices;
monitoring the lengths and directions of encrypted frames by the application between the two wireless devices;
repeating the providing, operating, and monitoring steps for a second or more hardware configuration;
analyzing the lengths and directions of encrypted frames responsive to one or more hardware configurations to determined a statistical frame pattern, wherein the statistical frame pattern is used to determine the application operating between the two wireless devices; and
if the lengths and directions of the encrypted frames in the first and second hardware configurations are similar, associating the application with a pattern comprising the lengths and directions of the monitored frames.

23. The method of claim 22, wherein patterns are determined for a plurality of applications.

24. The method of claim 23, wherein a plurality of patterns are loaded into a data store.

25. A method of determining the content of frames by matching to known statistical patterns, the method comprising the steps of:
loading a content analysis engine and a plurality of known statistical patterns, wherein the known statistical patterns are used to determine applications operating over a wireless network;
starting a data source, the data source receives incoming frames transmitted between two nodes on a network;
determining whether an encrypted frame matches a first line in the plurality of known statistical patterns; and
it a match is found in the checking step, loading a detection thread, wherein the detection thread comprises the steps of:
receiving subsequent incoming encrypted frames transmitted between two nodes on the network; and
matching the subsequent incoming encrypted frames to subsequent lines in the plurality of known statistical patterns until a predetermined frame count is met.

26. A system for determining an application associated with the content of wireless frames transmitted between two nodes on a wireless network, comprising:
a monitoring device operable to monitor and capture encrypted frame lengths and encrypted frame directions of a plurality of encrypted frames transmitted between nodes on the wireless network;
a data store loaded with known statistical patterns corresponding to different applications, wherein the known statistical patterns are used to determine the application operating over the wireless network; and
a computer operable to receive the encrypted frame lengths and encrypted frame directions of the plurality of encrypted frames, the computer being further operable to perform statistical matching of the encrypted frame lengths and encrypted frame directions to the known statistical patterns in the data store;
wherein a statistical matching enables the computer to identify an application associated with the content being transmitted over the wireless network.

27. A method of determining an application associated with content of frames transmitted on a wireless network, the method comprising the steps of:
monitoring a plurality of encrypted frames transmitted between nodes on the wireless networks; and
matching the plurality of encrypted frames to known statistical patterns of encrypted frame lengths and direction between the nodes, wherein the known statistical patterns are used to determine the application operating over the wireless network; and
identifying an application associated with the content of encrypted frames transmitted on the network based upon a match between the known statistical patterns to the encrypted frame lengths and direction, the known statistical patterns being associated with the application.

* * * * *

UNITED STATES PATENT AND TRADEMARK OFFICE
CERTIFICATE OF CORRECTION

| | | |
|---|---|---|
| PATENT NO. | : 7,970,013 B2 | Page 1 of 1 |
| APPLICATION NO. | : 11/424628 | |
| DATED | : June 28, 2011 | |
| INVENTOR(S) | : Sinha et al. | |

It is certified that error appears in the above-identified patent and that said Letters Patent is hereby corrected as shown below:

In Column 22, Line 23, in Claim 25, delete "it a" and insert -- if a --, therefor.

Signed and Sealed this
Eleventh Day of December, 2012

David J. Kappos
*Director of the United States Patent and Trademark Office*